United States Patent
Takahashi et al.

(10) Patent No.: US 8,970,876 B2
(45) Date of Patent: Mar. 3, 2015

(54) PRINTING SYSTEM, CLOUD COMPUTING SYSTEM, PRINTING SYSTEM CONTROL METHOD, AND STORAGE MEDIUM

(75) Inventors: Takeshi Takahashi, Yokohama (JP); Makoto Mihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 473 days.

(21) Appl. No.: 13/030,873

(22) Filed: Feb. 18, 2011

(65) Prior Publication Data
US 2011/0205586 A1  Aug. 25, 2011

(30) Foreign Application Priority Data

Feb. 22, 2010  (JP) .................................. 2010-036555
May 24, 2010  (JP) .................................. 2010-118747

(51) Int. Cl.
*G06F 3/12*  (2006.01)
*G06F 9/50*  (2006.01)

(52) U.S. Cl.
CPC .................................... *G06F 9/5027* (2013.01)
USPC ........................................................ 358/1.15

(58) Field of Classification Search
None
See application file for complete search history.

(56) References Cited

U.S. PATENT DOCUMENTS

| | | | |
|---|---|---|---|
| 5,978,560 A | 11/1999 | Tan | |
| 2002/0113995 A1* | 8/2002 | Evans et al. | 358/1.15 |
| 2005/0174420 A1* | 8/2005 | Hayashi | 347/130 |
| 2006/0192997 A1 | 8/2006 | Matsumoto | |
| 2007/0146778 A1 | 6/2007 | Kitagata | |
| 2008/0180729 A1 | 7/2008 | LaVigne | |
| 2008/0285075 A1 | 11/2008 | Yamanakajima | |
| 2009/0015623 A1* | 1/2009 | Miyamoto | 347/19 |
| 2009/0268221 A1 | 10/2009 | Hirahara | |
| 2010/0073707 A1* | 3/2010 | Ferlitsch | 358/1.15 |
| 2011/0007347 A1* | 1/2011 | Kamath et al. | 358/1.15 |

FOREIGN PATENT DOCUMENTS

| | | |
|---|---|---|
| CN | 101334714 A | 12/2008 |
| JP | 2000-155695 A | 6/2000 |
| JP | 2000-357024 A | 12/2000 |
| JP | 2002-304271 A | 10/2002 |
| JP | 2004-102934 A | 4/2004 |
| JP | 2007-122650 A | 5/2007 |
| JP | 2007-226565 A | 9/2007 |
| JP | 2007249672 * | 9/2007 |
| JP | 2009-129340 A | 6/2009 |
| JP | 2009-294863 A | 12/2009 |
| KR | 10-2001-0035171 A | 5/2001 |
| KR | 10-2004-0086510 A | 10/2004 |

* cited by examiner

*Primary Examiner* — Fan Zhang
(74) *Attorney, Agent, or Firm* — Canon USA, Inc., IP Division

(57) ABSTRACT

A cloud computing system includes an input data storage unit, a data input unit, an output data storage unit, and a data extraction unit. When an execution instruction is externally input, the cloud computing system reads data from the input data storage unit and processes the read data. Then, the cloud computing system stores a result of processing of the data on the output data storage unit.

9 Claims, 21 Drawing Sheets

FIG.6

600 QUEUE MESSAGE

Request:
PUT http://print-sv.queue.net:10001/dev_0001queue/messages —601

Headers: —602
x-ms-date:Mon,14 Sep 2009 17:00:25 GMT
Authorization:SharedKey dev_0001queue:sr8rlheJmCd6npMSx7DfAY3L//V3uWvSXOzUBCV9wnk=

Body:
<QueueMessage>
<MessageText>pk01|job01<MessageText> —603
</QueueMessage>

FIG.7

700 JOB TABLE

| 701 | 702 | 703 | 704 | 705 | 706 | 707 | 708 | 709 | 710 |
|---|---|---|---|---|---|---|---|---|---|
| ETag | Partition Key | Row Key | Start Time | End Time | Status | Data ID | Last Task | LastTask Result | LastTask TryCount |
| abcdefg12 | pk01 | job01 | 2010/1/1 9:01:55 | 1900/1/1 00:00:00 | Processing | sfe-125 | 1 | None | 0 |
| faraighaio | pk02 | job02 | 1900/1/1 00:00:00 | 1900/1/1 00:00:00 | Ready | Ay4-314 | 0 | None | 0 |

| 711 | 712 | 713 | 714 | 715 | … | 716 | 717 |
|---|---|---|---|---|---|---|---|
| Max Task | Task1 ServiceID | Task1 Parameter | Task2 ServiceID | Task2 Parameter | … | Task20 ServiceID | Task20 Parameter |
| 2 | service01 | \<Server\>http://docserver/library/\</Server\>\<Path\>folder/file.pdf\</Path\> | service2 | \<Server\>http://printserver/\</Server\>\<device\>device01\</device\> | … | | |
| 5 | serviceXX | | serviceYY | | … | | |

FIG.8

800 SERVICE TABLE

| ETag | Partition Key | Row Key | URL | Type | Attribute | Verification |
|---|---|---|---|---|---|---|
| awe4jsm | service | service01 | http://xxx/connector/download | In | http://docserver/library | |
| judjtgh | service | service02 | http://yyy/converter/pdf | Pipe | | |
| gawegwe | service | service03 | http://zzz/printservice/print | Out | http://printserver/ | TRUE |

| | 901 | 902 | 903 | 904 | 905 | 906 | 907 | ... | 908 | 909 |
|---|---|---|---|---|---|---|---|---|---|---|
| | ETag | Partition Key | Row Key | MaxTask | Task1 | Task2 | Task3 | ... | Task19 | Task20 |
| | hjaoerke | sequence | seq01 | 3 | service01 | service02 | service03 | ... | | |
| | er4lseaa | sequence | seq02 | 2 | service01 | service03 | | ... | | |

900 SERVICE SEQUENCE TABLE

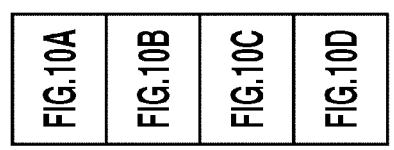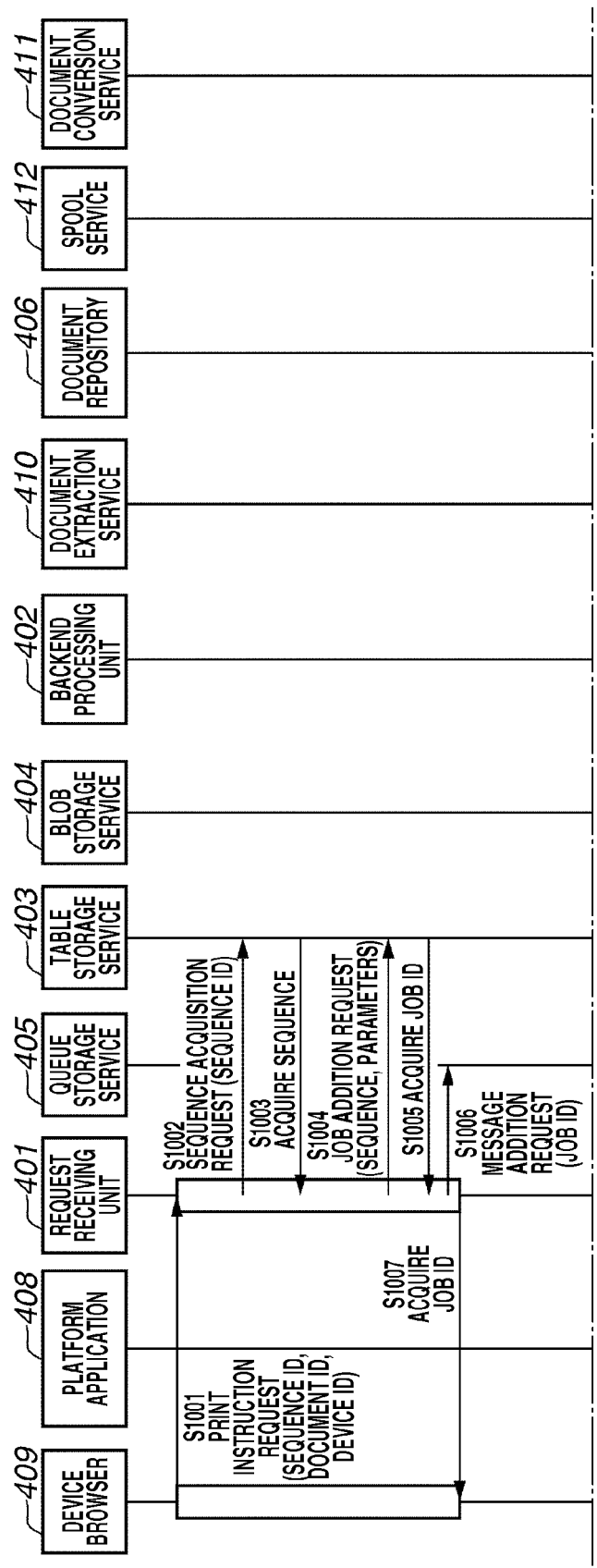

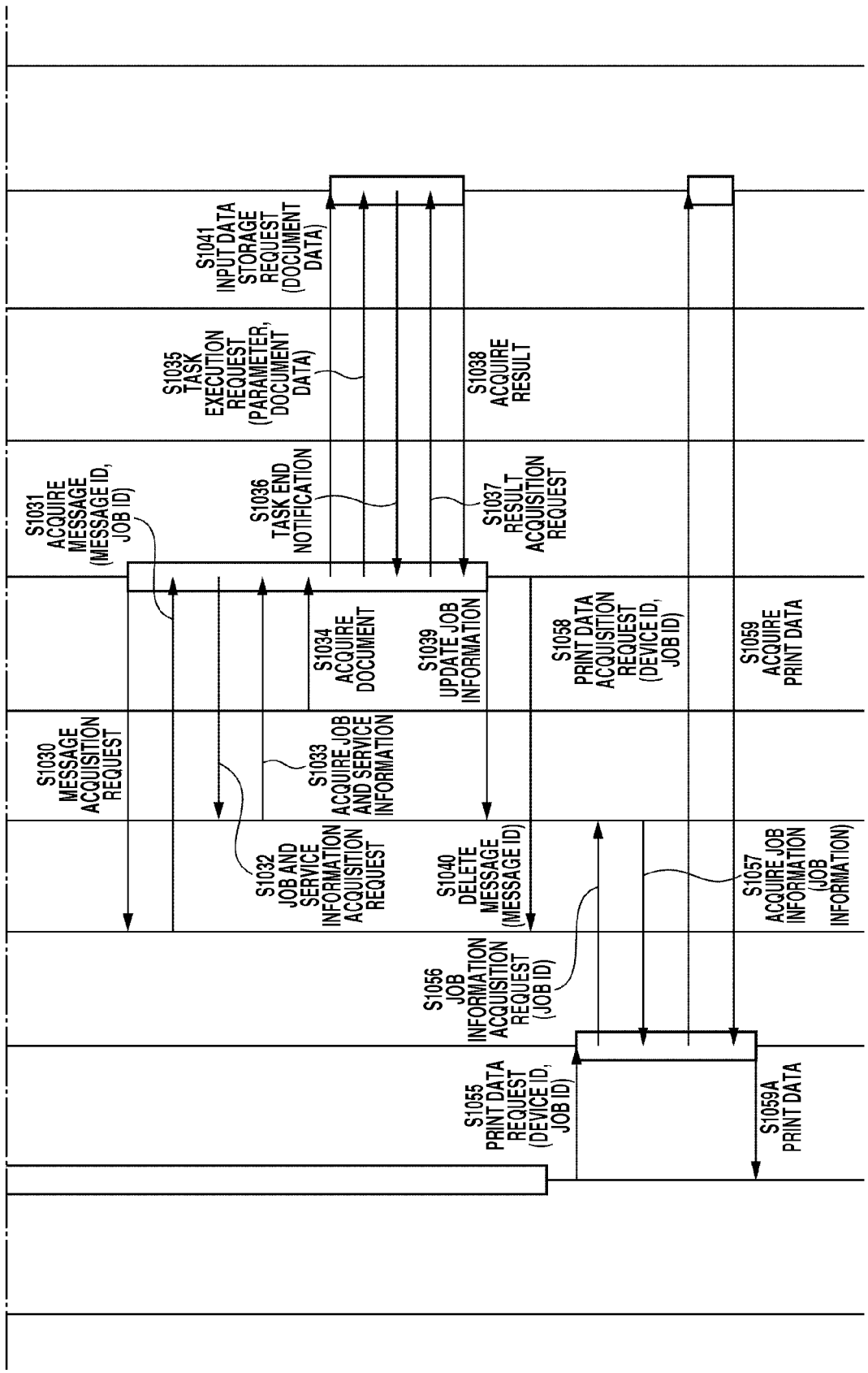

FIG.13

1300 SERVICE QUALITY STATISTICAL TABLE

| ETag | Partition Key | Row Key | ExecCount | ErrorCount |
|---|---|---|---|---|
| fqerth | dev1 | service01 | 21415 | 12 |
| bfewt | dev2 | service02 | 3441 | 3000 |
| ijutrku | dev2 | service03 | 3333 | 2 |

1301　1302　1303　1304　1305

PRINTING SYSTEM, CLOUD COMPUTING SYSTEM, PRINTING SYSTEM CONTROL METHOD, AND STORAGE MEDIUM

BACKGROUND OF THE INVENTION

1. Field of the Invention

The present invention relates to a printing system, a cloud computing system, and a printing system control method.

2. Description of the Related Art

A content management system that uses the Internet communication method has been widespreadly used. In such a content management system, a user accesses a web page provided by a server computer from a client computer via the Internet. Furthermore, the user selects a content to be viewed on the web page. The content management system transmits the selected content to the server computer. The server computer executes control for displaying the received content on a screen of the client computer operated by the user.

Japanese Patent Application Laid-Open No. 2002-304271 discusses a method for printing a content read by a user via a screen of a client computer by using a printer. In the conventional method, the server computer converts the content viewed by the user into data that can be printed by a printer. In addition, the server computer transmits the converted data to the printer. The printer prints the received data.

Meanwhile, in recent years, various methods, such as a cloud computing system or Software as a Service (SaaS) have been utilized, in which a server computer executes various processing.

In the cloud computing system, a large number of computing resources are utilized to distributedly convert and process data. In the cloud computing system like this, a plurality of requests input from a plurality of different clients can be processed in parallel to one another.

Furthermore, in a recent growing demand for an open system, a system, which has been developed as a platform and executes or cooperatively operates service applications thereon, has been used.

SUMMARY OF THE INVENTION

According to an aspect of the present invention, a cloud computing system includes an image processing apparatus, a platform system configured to provide a distributed environment, and a web service. In the cloud computing system, the image processing apparatus includes a transmission unit configured to transmit a job to the platform system. The platform system includes an insertion unit configured to, under control of a request receiving program, insert the job transmitted by the transmission unit into a queue, an identification unit configured to, under control of a back-end processing program, acquire the job inserted into the queue by the insertion unit and to identify a processing status of the job, and a selection unit configured to, under control of the back-end processing program, select a task service, usable to execute task processing of the job, from among a plurality of task services provided by the web service based on the processing status identified by the identification unit. The task service selected by the selection unit includes an execution unit configured to execute task processing of the job. The platform system includes a receiving unit configured to, under control of the back-end processing program, receive information about a result of the task processing executed by the execution unit from the task service, and if it is determined that the processing of the job has been completed based on information received by the receiving unit, the platform system transmits to the image processing apparatus, under control of the request receiving program, information used by the image processing apparatus to acquire a result of processing of the job.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 6 illustrates an example of a queue message according to the first exemplary embodiment of the present invention.

FIG. 7 illustrates an example of a job table according to the first exemplary embodiment of the present invention.

FIG. 8 illustrates an example of a service table according to the first exemplary embodiment of the present invention.

FIG. 9 illustrates an example of a service sequence table according to the first exemplary embodiment of the present invention.

FIG. 13 illustrates an example of a service quality statistical table according to the first exemplary embodiment of the present invention.

DESCRIPTION OF THE EMBODIMENTS

Various exemplary embodiments, features, and aspects of the invention will be described in detail below with reference to the drawings.

To begin with, definitions of terms used in each exemplary embodiment of the present invention will be described in detail below. In the present invention, "print data processing" refers to processing for converting a content that a user desires to print into data printable on an image forming apparatus, such as a multifunction peripheral (MFP) or a printer.

A "content" refers to electronic data including a combination of document data (e.g., a text) and image data (e.g., a raster image including bitmap (BMP)). Furthermore, "print data" refers to data generated by converting a content by print data processing. More specifically, print data includes page description language (PDL) data, portable document format (PDF) data, and a raster image.

Figure 1:
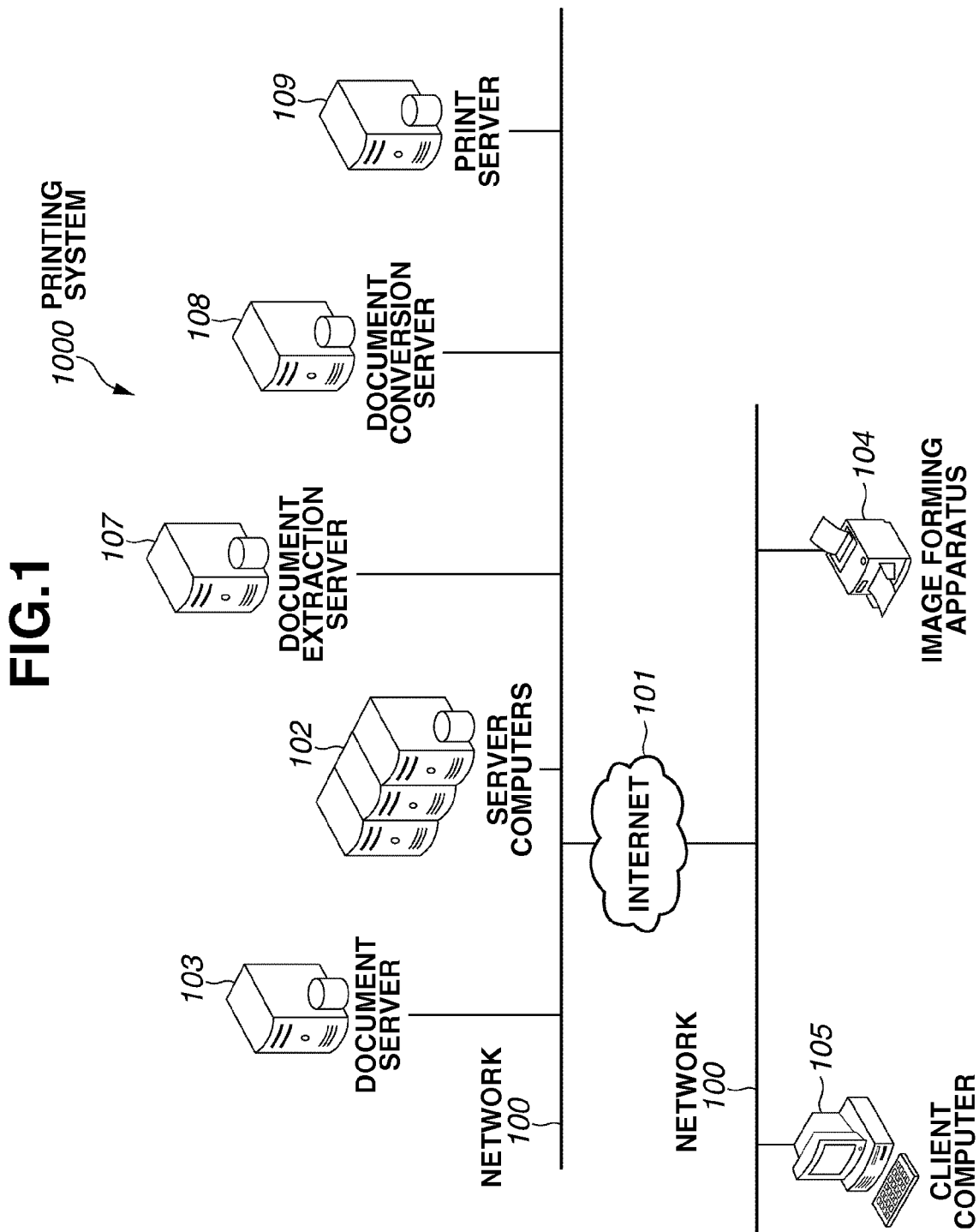
FIG. 1 illustrates an exemplary configuration of a printing system according to a first exemplary embodiment of the present invention.

Apparatuses included in a network printing system 1000 according to the present exemplary embodiment will be described in detail below with reference to FIG. 1. Referring to FIG. 1, apparatuses included in the network printing system 1000 are in communication with one another via a network 100. The apparatuses included in the network printing system 1000 include server computers 102, a document server 103, an image forming apparatus 104, a client computer 105, a document extraction server 107, a document conversion server 108, and a print server 109. In the present exemplary embodiment, the network printing system 1000 is also referred to as a "cloud computing system".

The network 100 is a communication line for data communication among the above-described apparatuses. The Internet 101 is a communication line for data communication among the above-described apparatuses over a firewall. Via the Internet 101, the communication with the network 100 including the server computers 102 can be executed from the network 100 including the image forming apparatus 104 and the client computer 105 over the firewall.

The network 100 and the Internet 101 are communication networks that support Transmission Control Protocol/Internet Protocol (TCP/IP). The communication via the network 100 and the Internet 101 can be either wired or wireless. In an exemplary embodiment of the present invention, in the example illustrated in FIG. 1, although the server computers 102 are illustrated as one server, it is supposed that the server computers 102 include a plurality of server computers.

Figure 2:
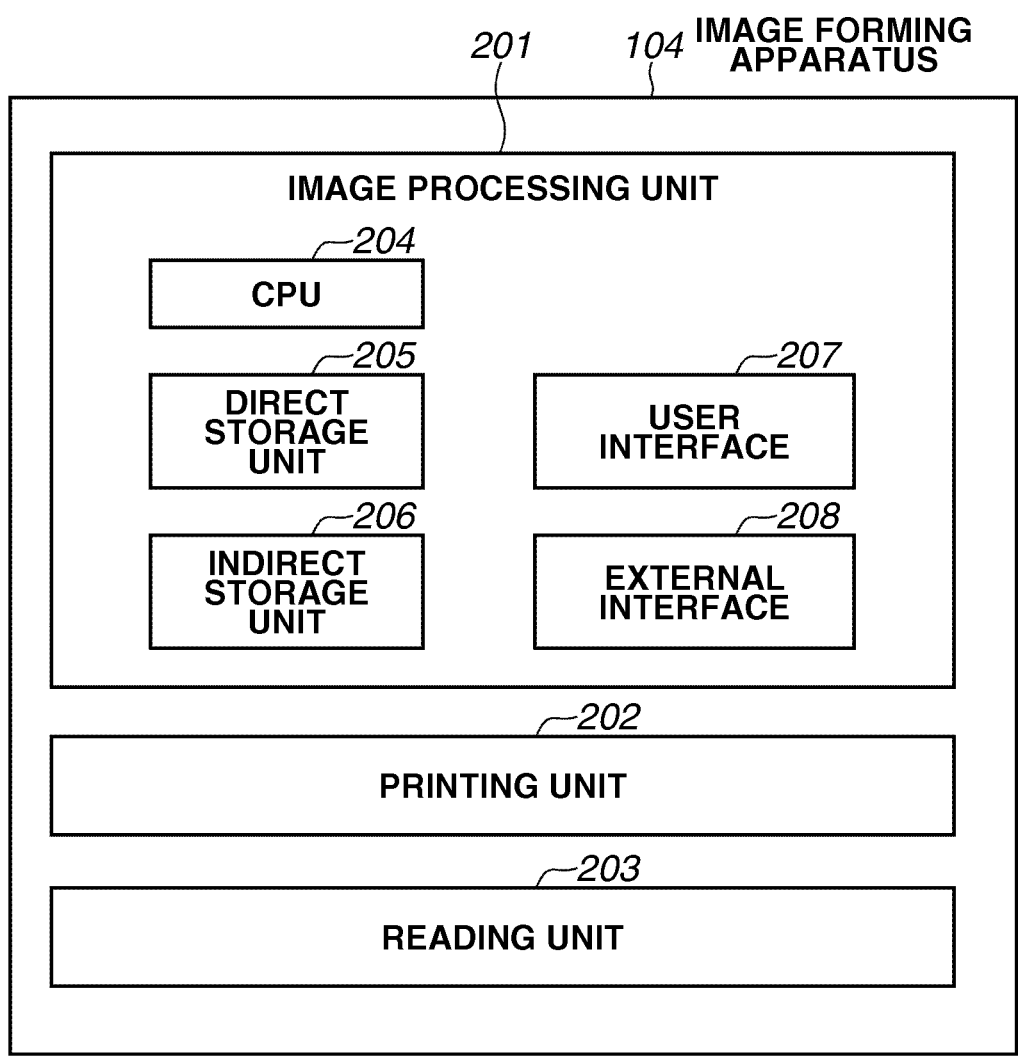
FIG. 2 illustrates a detailed exemplary inner configuration of an image forming apparatus according to the first exemplary embodiment of the present invention.

Now, an exemplary inner configuration of each apparatus included in the network printing system 1000 illustrated in FIG. 1 will be described in detail below. At first, an exemplary inner configuration of the image forming apparatus 104 will be described in detail below with reference to FIG. 2. FIG. 2 is a block diagram illustrating an exemplary inner configuration of the image forming apparatus 104.

The image forming apparatus 104 includes an image processing unit 201, a printing unit 202, and a reading unit 203. The image processing unit 201 includes a central processing unit (CPU) 204, a direct storage unit 205, an indirect storage unit 205, a user interface 207, and an external interface 208.

The CPU 204 is a unit that executes a predetermined program and instructs various control operations on the image forming apparatus 104. The direct storage unit 205 is a work memory used by the CPU 204 in executing the program. The program executed by the CPU 204 is loaded on the direct storage unit 205. The direct storage unit 205 is implemented by a random access memory (RAM).

The indirect storage unit 206 stores various programs, such as an application program, and a platform program. Various programs stored on the indirect storage unit 206 are moved by the CPU 204 onto the direct storage unit 205 when the CPU 204 executes the program. The indirect storage unit 206 is implemented by a solid state drive (SSD) or a hard disk drive (HDD). A multiprocessor can also be used as the CPU 204.

Now, a platform, which is implemented by executing a platform program, will be described in detail below. By implementing a platform, it becomes possible to execute a new application originally developed by the user on the image forming apparatus 104 and to customize an operation screen of the image forming apparatus 104.

An exemplary method for implementing the platform will be described in detail below. The CPU 204 moves a platform program stored on the indirect storage unit 206 onto the direct storage unit 205. When the platform program is completely moved to the direct storage unit 205, the CPU 204 can execute the platform program.

In the present exemplary embodiment, a platform is "activated" when the platform program is executed by the CPU 204. The platform operates on firmware of the image forming apparatus 104. Furthermore, the platform program provides an environment for executing an application program described by using an object-oriented language.

A method for executing the application program on the platform will be described in detail below. In the present exemplary embodiment, printing software that receives a print request operates on the platform. The printing software can receive print data from a device connected via the network by using a communication protocol, such as Hypertext Transport Protocol (HTTP).

The printing software transmits the received print data to the firmware. After receiving the print data, the firmware starts print data processing. If the print data has a format with which the print data can be printed without executing the print data processing, the firmware omits the print data processing. As described above, an exemplary embodiment of the present invention can implement control of the image forming apparatus 104 by executing the application program on the platform.

An exemplary method for executing the application program will be described in detail below. After being activated, the platform moves the application program stored on the indirect storage unit 206 to the direct storage unit 205. After moving the application program, the platform can execute the application program. Then, the platform executes the application program.

In the present exemplary embodiment, the above-described function of the platform, which can provide a service for executing the application program on the platform, is referred to as a "platform application". Furthermore, the platform can execute a part of each processing illustrated in each flow chart discussed in the present exemplary embodiment.

The user interface 207 is a unit for receiving a processing request input by the user. More specifically, the user interface 207 receives a signal corresponding to an instruction input by the user via a keyboard or a mouse. The external interface 208 can transmit and receive data to and from an external apparatus. Furthermore, the external apparatus can include an external storage device, such as an external HDD or an external universal serial bus (USB) memory or a separate host computer or a separate image forming apparatus, which is connected via the network. The image forming apparatus 104 can communicate with the client computer 105 and the server computers 102 via the network 100 and the Internet 101.

The printing unit 202 has a function for printing print data that has been subjected to the print data processing on a recording medium. The reading unit 203 has a function for reading a document set on a document stand and for generating a document image. In the present exemplary embodiment, the reading unit 203 is a scanner.

Figure 3:
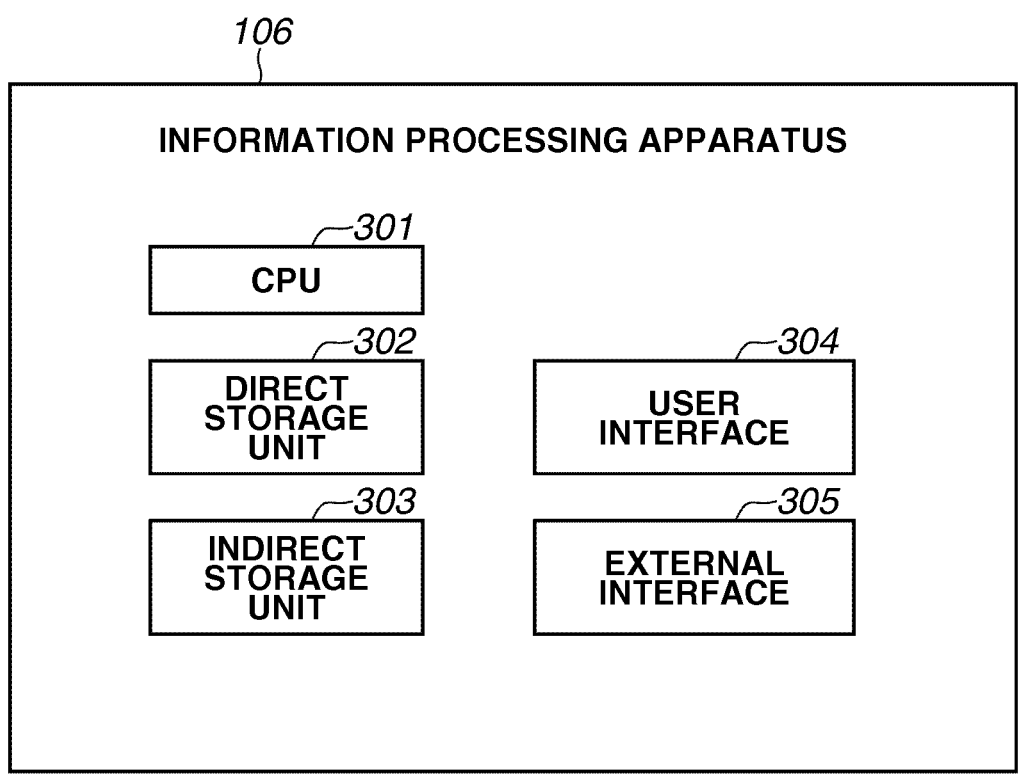
FIG. 3 illustrates a detailed exemplary inner configuration of an information processing apparatus according to the first exemplary embodiment of the present invention.

Secondly, an exemplary inner configuration of an information processing apparatus 106, which includes the server computers 102, the document server 103, the client computer 105, the document extraction server 107, the document conversion server 108, and the print server 109, will be described in detail below with reference to FIG. 3. FIG. 3 is a block diagram illustrating an exemplary inner configuration of the information processing apparatus 106.

The information processing apparatus 106 includes a CPU 301, a direct storage unit 302, an indirect storage unit 303, and an external interface 305. The user interface 304 is a unit for receiving a processing request input by the user. More specifically, the user interface 304 receives a signal corresponding to an instruction input by the user via a keyboard or a mouse.

The CPU 301 executes a predetermined program and inputs various instructions for controlling the information processing apparatus 106. The direct storage unit 302 is a work memory used by the CPU 301 in executing the program. The program executed by the CPU 301 is loaded on the direct storage unit 302. The direct storage unit 302 is implemented by a RAM.

The indirect storage unit 303 stores various programs, such as an application program, and an operating system (OS). Various programs stored on the indirect storage unit 303 are moved to the direct storage unit 302 when the CPU 301 executes the program. The indirect storage unit 303 includes a read-only memory (ROM) or an HDD. The external interface 305 is connected to the network 100. Accordingly, the information processing apparatus 106 can communicate with other apparatuses on the network 100.

Figure 4:
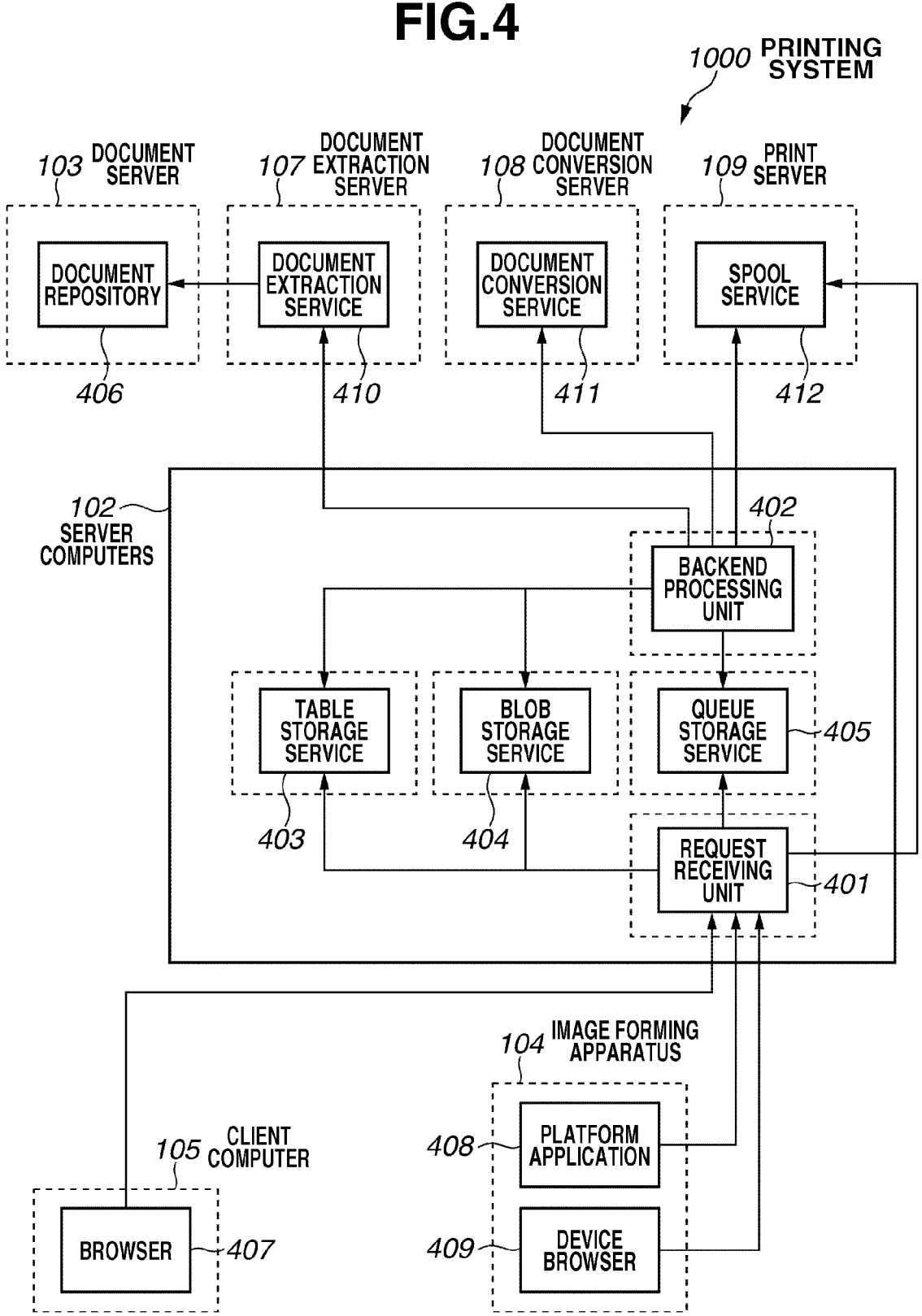
FIG. 4 illustrates an exemplary functional configuration of each apparatus included in the printing system according to the first exemplary embodiment of the present invention.

Now, functions of the apparatuses included in the printing system 1000 according to the present exemplary embodiment will be described in detail below with reference to FIG. 4. FIG. 4 is a block diagram illustrating an example of a function of each apparatus included in the printing system 1000.

To begin with, a function of the server computers 102 will be described in detail. In the present exemplary embodiment, the server computers 102 include various functions, such as a request receiving unit 401, a back-end processing unit 402, a table storage service 403, a blob storage service 404, and a queue storage service 405. In the present exemplary embodiment, at least one server computer having the request receiving unit 401 exists.

In addition, at least one server computer having the back-end processing unit 402 exists. Furthermore, at least one server computer having functions of the table storage service 403, the blob storage service 404, and the queue storage service 405 exists. The above-described function can be provided to mutually different server computers.

The request receiving unit 401 provides a function for receiving a processing request transmitted from the client computer 105 or the image forming apparatus 104. The back-end processing unit 402 has a function for processing a processing request by using a processing program. In the present exemplary embodiment, the "processing request" refers to a processing request received by the request receiving unit 401.

The back-end processing unit 402 loads and executes the processing program on the direct storage unit 302 of the server computer that currently executes the back-end processing unit 402. The request receiving unit 401 and the back-end processing unit 402 are implemented by the CPU 301 by loading and executing a request receiving program or a back-end processing program stored on the indirect storage unit 303 (FIG. 3) on the direct storage unit 302. The request receiving unit 401 and the back-end processing unit 402 will be described in detail below.

The table storage service 403 provides a function for storing various status information, such as the status of progress of the processing executed by the back-end processing unit 402. The table storage service 403 is implemented by the CPU 301 by loading and executing a table storage service program from the indirect storage unit 303 (FIG. 3) on the direct storage unit 302. In addition, data is stored on the indirect storage unit 303. The table storage service 403 will be described in detail below.

The blob storage service 404 provides a function for storing various data, such as execution result data of processing by the back-end processing unit 402. The blob storage service 404 is implemented by the CPU 301 by loading and executing a blob storage service program from the indirect storage unit 303 (FIG. 3) on the direct storage unit 302. Data is stored on the indirect storage unit 303. The blob storage service 404 will be described in detail below.

The queue storage service 405 provides the following two functions. Firstly, the queue storage service 405 has a function for establishing an asynchronous data communication between the request receiving unit 401 and the back-end processing unit 402. Secondly, the queue storage service 405 has a function for causing a queue message that has been added to a queue to become invisible or visible. A "queue" refers to a storage function implemented by the queue storage service 405. Furthermore, a queue is implemented by a list structure "first-in first-out (FIFO)".

The first function will be described in detail below. The request receiving unit 401 and the back-end processing unit 402 communicate with each other by the following method. At first, the request receiving unit 401, after receiving a processing request input by the user, generates a ticket "queue message", which corresponds to the processing request from the user.

A queue message 600 is stored in the queue by the request receiving unit 401. After acquiring the queue message 600 from the queue, the back-end processing unit 402 refers to the queue message 600 and processes the processing request from the user. In the above-described manner, the back-end processing unit 402 provides a solution to the processing request from the user.

By utilizing the queue service 405, the request receiving unit 401 and the back-end processing unit 402 can communicate with each other asynchronously. The first and the second functions will be described in more detail below.

The queue storage service 405 is implemented by the CPU 301 by loading and executing a queue storage service program from the indirect storage unit 303 (FIG. 3) on the direct storage unit 302. Data is stored on the indirect storage unit 303. The server computers 102 have the above-described functions. The functions of the server computers 102 will be described in more detail below.

An exemplary function of the document server 103 will be described in detail below. The document server 103 has a function of the document repository 406. The document repository 406 is implemented by the indirect storage unit 303 illustrated in FIG. 3. More specifically, the document repository 406 stores a content instructed by the user to be printed from the client computer 105 or the image forming apparatus 104. The content stored on the document repository 406 includes the following content as well as a previously stored content.

In other words, the document repository 406 also stores a content generated by the user via a browser 407 or a device browser 409, which will be described in detail below, by using the application operating on the server computers 102. Accordingly, if a content is generated by using the application on the server computers 102, the content can be easily printed without installing an application on the client computer 105.

The application operating on the server computers 102 refers to various applications, such as a document generation application, an image generation application, and a form management application. The application is stored on the indirect storage unit 303 illustrated in FIG. 3. When an instruction for executing the applications is input, the application is loaded and executed by the CPU 301 on the direct storage unit 302.

The image forming apparatus 104 will be described in detail below. The image forming apparatus 104 includes a function of the device browser 409 and the platform application 408. The device browser 409 has a function for allowing the user to view data and information stored within the device connected via the network 100. The device browser 409 is implemented by the CPU 204 by loading and executing a device browser program from the indirect storage unit 206 (FIG. 2) on the direct storage unit 205.

In addition, the user can input an instruction for printing the content via the device browser 409. The input print instruction is transmitted to the request receiving unit 401 of the server computers 102. The device browser 409 is a web browser, for example.

The platform application 408 provides a function for implementing various services. The platform application 408 is implemented by an application program operating on the platform. In the present exemplary embodiment, the platform application 408 provides a printing software service. As described above, the service can transmit the received print data to the firmware.

In addition, the service verifies whether the request receiving unit 401 has completed processing for generating print data. More specifically, the service determines whether the request receiving unit 401 has completed processing for generating print data based on a job identification (ID) generated by the request receiving unit 401.

Now, the client computer 105 will be described in detail below. The client computer 105 provides a function of the browser 407. The browser 407 provides a function for allowing the user to view data and information stored within the device connected via the network 100. The browser 407 is implemented by the CPU 301 by loading and executing a browser program from the indirect storage unit 303 (FIG. 3) on the direct storage unit 302. The browser 407 is a web browser, for example.

The document extraction server 107 will be described in detail below. The document extraction server 107 provides a function of a document extraction service 410. The document extraction service 410 is implemented by the CPU 301 by loading and executing a document extraction program from the indirect storage unit 303 (FIG. 3) on the direct storage unit 302. The document extraction service 410 provides a function for accessing the document server 103 according to a document extraction instruction received via the external interface 305 and for acquiring the content stored on the document repository 406. As described above, the document extraction service 410 provides a web service.

The document conversion server 108 will be described in detail below. The document conversion server 108 has a function of a document conversion service 411. The document conversion service 411 is implemented by the CPU 301 by loading and executing a document conversion program from the indirect storage unit 303 (FIG. 3) on the direct storage unit 302.

The document conversion service 411 includes a function for converting instructed data (content) into a predetermined data format according to a document conversion instruction received via the external interface 305. More specifically, in the present exemplary embodiment, the document conversion service 411 includes a function for converting the content into portable document format (PDF) data. As described above, the document conversion service 411 provides a web service.

Lastly for the description about the components of the information processing apparatus 106, the print server 109 will be described in detail below. The print server 109 has a function of a spool service 412. The spool service 412 is implemented by the CPU 301 by loading and executing a spool program from the indirect storage unit 303 (FIG. 3) on the direct storage unit 302. The spool service 412 has a function for generating and assigning an attribute necessary for printing instructed data according to an instruction received via the external interface 305 (i.e., information such as a print priority or tint information). As described above, the print server 109 provides a web service.

The apparatuses included in the network printing system 1000 according to the present exemplary embodiment have the above-described functions.

Figure 5:
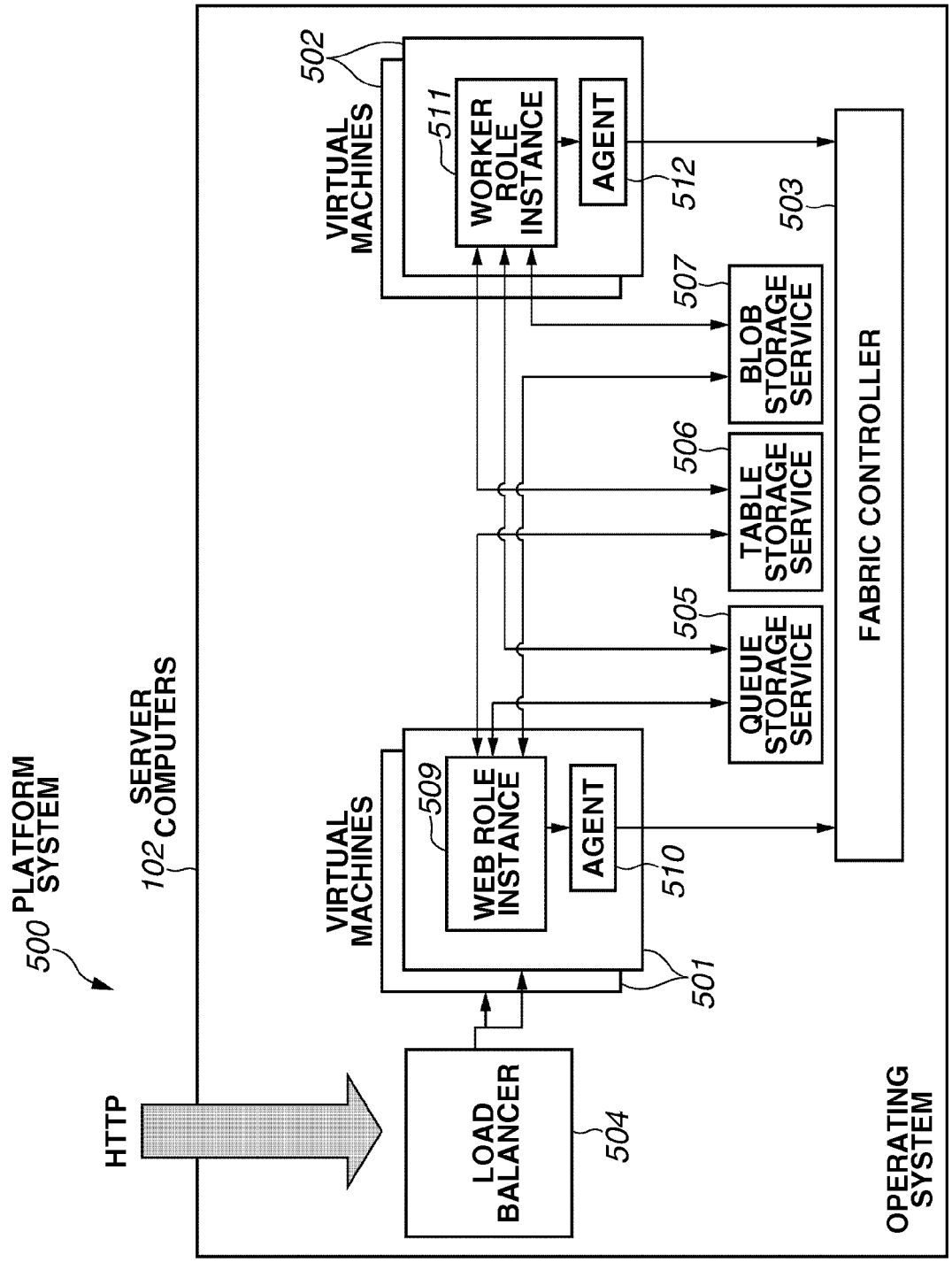
FIG. 5 illustrates an exemplary configuration of a platform system according to the first exemplary embodiment of the present invention.

A platform system of the server computers 102 will be described in detail below with reference to FIG. 5. FIG. 5 illustrates various exemplary functions of a platform system 500. Referring to FIG. 5, physical hardware resources existing within the server computers 102 are used to implement the platform system 500, which comprises two platform devices. A person who utilizes the platform system 500 of the server computers 102 can use the physical hardware resources included in the server computers 102 as computing resources. In addition, the platform system 500 is a system that provides a distributed (partitioned) environment.

The platform system (operating system (OS)) 500 of the server computers 102 provides the following functions:

Virtual machines 501 and 502
A fabric controller 503
A load balancer 504
A queue storage service ("Queue") 505
A table storage service ("Table") 506
A blob storage service ("Blob") 507

The platform system 500, which is implemented on the server computers 102, includes a plurality of virtual machines 501 and 502. A "virtual machine" refers to a logical computer which divides the server computers 102 into logical computers by using a virtualization method and which operates by using an independent OS, among the divided logical computers. The logical computers are counted in the unit of an "instance". In the present exemplary embodiment, one server computer included in the server computers 102 is assigned to one instance (i.e., one virtual machine).

The virtual machine 501 includes a request receiving unit ("web role instance") 509, and a request receiving unit agent ("agent") 510. The request receiving unit 509 receives a processing request from the user via the load balancer 504, which will be described in detail below. In addition, the request receiving unit 509 transmits the processing request to the virtual machine 502 via the queue storage service 505.

In order to secure a high availability of the request receiving unit 509, a request from an external network (in an exemplary embodiment of the present invention, the communication by HTTP) is executed via the load balancer 504, which is provided external to the virtual machine 501.

The load balancer 504 centrally manages requests input by the external network. In addition, the load balancer 504 selectively transfers the request to the plurality of virtual machines having a request receiving function similar to the request receiving unit 509.

The request receiving unit agent 510 collects various information including the status of use of the virtual machine 501, the operation status of the request receiving unit 509, the status of use of the resource of the virtual machine 501, and an error that has occurred on the request receiving unit 509. Furthermore, the request receiving unit agent 510 periodically transmits the collected information to the fabric controller 503.

The virtual machine 501 is equivalent to the request receiving unit 401 illustrated in FIG. 4. The virtual machine 501 is implemented by a request receiving program. Various functions of the virtual machine 501 are executed under control of the request receiving program.

Each instance of the request receiving unit 509 and the back-end processing unit 511 is managed by the fabric controller 503. Accordingly, the scalability and the availability of each instance are assured. More specifically, suppose that a specific instance of the request receiving unit 509 or the back-end processing unit 511 has been suspended due to a failure on the server. In this case, the fabric controller 503 cannot receive a periodical notification from the request receiving unit agent 510 or the back-end processing unit agent 512.

If the fabric controller 503 does not receive a periodic notification, the fabric controller 503 inputs an instruction to the virtual machine for delegating a new instance to execute the processing. In other words, the new virtual machine functions as a substitute to the virtual machine that cannot be activated due to a failure or an incident equivalent to the failure. As a result, the number of instances currently executing the processing can be kept constant. Accordingly, delay in the processing can be suppressed.

The virtual machine 502 includes the back-end processing unit ("worker role instance") 511 and the back-end processing unit agent ("agent") 512. The back-end processing unit 511 receives a processing request input by the request receiving unit 509 via the queue storage service 505. The back-end processing unit 511 executes the processing request received from the request receiving unit 509 via the queue storage service 505. In addition, the back-end processing unit 511 executes scale out.

The "scale out" refers to an increase of the number of instances of the back-end processing unit 511 that occurs due to the increase of the number of virtual machines 502. When the instances of the back-end processing unit 511 increases, the amount of data processing assigned to one back-end processing unit decreases. Accordingly, in this case, a result of executing a processing request input by the user can be very quickly returned. The request receiving unit 509 receives a scale-out instruction. The virtual machine 502 is equivalent to the back-end processing unit 402 illustrated in FIG. 4. The virtual machine 502 is implemented by a back-end processing program. Various functions of the virtual machine 502 are executed under control of the back-end processing program.

The queue service 505 provides a service for implementing asynchronous data communication between the request receiving unit 509 and the back-end processing unit 511. The request receiving unit 509 and the back-end processing unit 511 execute asynchronous data communication by inputting various instructions to the queue storage service 505. The asynchronous data communication between the request receiving unit 509 and the back-end processing unit 511 will be described in detail below. The instruction that the request receiving unit 509 inputs to the queue storage service 505 includes a queue message addition instruction. The instruction that the back-end processing unit 511 inputs to the queue storage service 505 includes a queue message acquisition instruction and a queue message deletion instruction.

A series of asynchronous data communication operations executed between the request receiving unit 509 and the back-end processing unit 511 will be described in detail below. The request receiving unit 509 generates a queue message 600 according to a processing request input by the user. In addition, the request receiving unit 509 transmits a queue addition instruction to the queue storage service 505, which instructs addition of the queue message 600 to the queue. After receiving the queue addition instruction, the queue storage service 505 adds the queue message 600 to the queue.

In order to acquire the queue message 600, the back-end processing unit 511 inputs a queue message acquisition instruction to the queue storage service 505. After receiving the queue message acquisition instruction, the queue storage service 505 returns the queue message 600 and a message ID and a job ID uniquely assigned to each queue message 600 to the back-end processing unit 511 in response to the queue message acquisition instruction.

More specifically, the "message ID" refers to unique information assigned to each queue message 600 in order to uniquely define the queue message 600. The message ID is used by the back-end processing unit 511, whose processing has been completed, in inputting an instruction for deleting the queue message 600. The job ID is an ID for uniquely defining the content of the actual processing.

After completing the processing request, the back-end processing unit 511 inputs an instruction for deleting the queue message corresponding to the message ID to the queue storage service 505. After receiving the queue message deletion instruction, the queue storage service 505 deletes the queue message corresponding to the message ID instructed by the back-end processing unit 511. Accordingly, redundant processing for processing the same queue message, which may be adversely executed by the back-end processing units 511 different from the back-end processing unit 511 that has output the queue message deletion instruction, can be effectively prevented.

Furthermore, the queue storage service 505 has a function for causing the queue message 600 that has been added to the queue to become visible or invisible. More specifically, if the queue message 600 is caused to be "invisible", the queue storage service 505 does not transfer the queue message 600 to the back-end processing unit 511 even if the back-end processing unit 511 has input a request for acquiring the queue message 600 that has been added to the queue.

After acquiring the queue message 600 from the queue, the acquired queue message is caused to become visible by the queue storage service 505. If the queue message is to become "visible", the queue storage service 505 transfers the queue message to the back-end processing unit 511 if the back-end processing unit 511 has input a request for acquiring the queue message 600 that has been added to the queue.

The queue message that has been acquired by the back-end processing unit 511 and caused to be visible may be caused by the queue storage service 405 to become visible unless a processing result is returned from the back-end processing unit 511 that currently executes the processing within a predetermined time. The term "visible" refers to the same state as described above. Accordingly, if the back-end processing unit 511 has been abnormally terminated and cannot continue the processing, the processing is to be automatically retried.

The table storage service 506 provides storage utilized in storing data. The table storage service 506 stores the data in a simple format including a combination of an entity and a property of type information.

The blob storage service 507 provides storage utilized in storing data. More specifically, the blob storage service 507 provides a function for storing an aggregate of binary data.

The queue message 600 according to the present exemplary embodiment will be described in detail below. FIG. 6 illustrates an example of the queue message 600. The queue message 600 describes a content of the processing that the request receiving unit 509 requests the back-end processing unit 511 to execte.

Referring to FIG. 6, a request 601 indicates a uniform resource locator (URL) of the queue storage service 505 to which the queue message 600 is to be added. The request receiving unit 509 analyzes a message illustrated in FIG. 6 and identifies the location of the queue storage service 505. Furthermore, the request receiving unit 509 inputs information included in a header 602 and thereafter of the message illustrated in FIG. 6.

The header 602 stores authentication information for accessing the queue storage service 505. The authentication information includes a hash value of a character string necessary for utilizing the queue storage service 505. The queue storage service 505 reads the header information and compares the read header information with a character string previously stored within the queue storage service 505 to execute the authentication. Furthermore, the queue storage service 505 determines whether the queue message 600 including the header 602 can be accepted.

Now, a message data content portion of the queue message 600 will be described in detail below. The message data content portion is determined according to the processing request input by the user. A portion <MessageText> 603 indicates the job ID. In the example illustrated in FIG. 6, the job ID "pk01|job01" is included in the portion <MessageText> 603. The job ID is unique information generated according to the processing request input by the user. In other words, the job ID included in the portion <MessageText> 603 is equivalent to the above-described job ID.

A job table according to the present exemplary embodiment will be described in detail below. The job table manages a series of processing executed by the back-end processing unit 402 as a job and stores the content of the job and the status of progress of the processing of the job. The job table is stored in the table storage service 506.

FIG. 7 illustrates an actually stored job table 700. Referring to FIG. 7, an ETag field 701 is a value automatically set by the table storage service 506. If the string data is updated, a unique value is written in the ETag field 701. In updating the data acquired from the table, if the value of the ETag field 701 at the time of acquisition of the data and the value of the ETag field 701 at the time of updating the data differ from each other, it can be identified that the table has been updated by another processing (back-end processing).

A partition key field 702 and a row key field 703 indicate an ID for uniquely identifying each row of the table. In the job table 700, values of the two key fields 702 and 703 identify a job. In other words, the two values are equivalent to the job ID. However, alternatively, the job ID can be defined by the row key only.

To a start time field 704, date and time of start of processing a job processed by the back-end processing unit 402 is registered. To an end time field 705, date and time of end of processing the job is registered. Before or after a job is started, initial values are set to the start time field 704 and the end time field 705.

A status field 706 stores a status of the entire job. The status of the job includes "Ready" (preparation completed), "Processing" (processing currently executed), "Success" (job successfully processed), and "Failure" (processing of the job failed).

The completed preparation status ("Ready") indicates the status before the back-end processing unit 402 starts processing the job after the request receiving unit 401 has added the job to the job table. The in-progress processing status ("Processing") corresponds to the status after the back-end processing unit 402 has started the processing of the job and before all the tasks defined by the job have been completed or to the status before the processing fails halfway through the job.

The successfully processed job ("Success") indicates the status in which the back-end processing unit 402 has processed all the tasks defined in the job and in which the processing of all the tasks has been successfully executed. The failed job processing ("Failure") indicates the status in which the task has not been successfully processed as a result of executing the task by the back-end processing unit 402 or the state in which it is determined that the quality of the service does not satisfy a predetermined reference condition before executing the task.

As described above, one job includes one or more tasks. When all of the one or more tasks included in the job are completely processed, the processing of one job is completed.

A data ID field 707 stores an ID assigned to the data associated with the job. The data ID is stored in the blob storage service 507 and is a unique value within the blob storage service 507.

A last task field 708 records the task number of a task that has been completed. A job includes a plurality of tasks that is to be serially processed. Now, the "task" will be described in detail below. Suppose that a job including two tasks exists and that the name of the job is "job A". The job A includes a combination of a first task for acquiring a file from the document server 103 and a second task for inputting data to the print server 109. In the present invention, the first task is defined as "task 1" and the second task is defined as "task 3". The job A is processed by serially executing the two tasks.

If the processing has progressed up to the completion of the task for acquiring a file from the document server 103, a value "1" is recorded to a last task field 708. If no task has been completely executed yet, a value "0" is recorded to the last task field 708. On the other hand, if the processing has progressed up to the completion of the task for inputting data to the print server 109, a value "3" is recorded to the last task field 708.

Although not illustrated in the drawing, in the present exemplary embodiment, the following task may exist. In other words, a task for inputting a file (content) acquired by the first task to the document conversion server 108 and for causing the document conversion server 108 to convert the input content. The above-described type of task is defined as a "task 2" in the present invention. When the task 2 is completely executed, a value "2" is recorded to the last task field 708. By referring to the last task field 708, the present status of progress of the processing of the task can be verified.

In the present exemplary embodiment, the tasks are executed in predetermined order. More specifically, the tasks included in the job A are executed in order of task 1, task 2, and task 3. The order of executing the tasks are defined in a service sequence table 900. The service sequence table 900 will be described in detail below.

A last task result field 709 stores a result of the processing of a task executed last. The task processing result is managed by using various parameters, such as "None" (indicating the status before the processing of the task is completed), "Success" (successfully completed task), "FailureRetry" (failed task that can be completed by retrying the same), and "Failure" (failed task). It is necessary to return a processing result by using either one of the above-described parameters for each task. If the processing of the task has been successfully completed, the parameter "Success" is returned.

More specifically, in registering print data to the print server 109, if the print server 109 cannot complete the processing due to a temporary high processing load or if the communication for transferring the data is temporarily discontinued, the task returns the following value. More specifically, the task returns a value "FailureRetry" for the uncompleted or the temporarily discontinued processing that is highly likely to be successfully completed if the processing is executed again. On the other hand, if the suspended or discontinued processing is not likely to be successfully completed even if the processing is executed again, i.e., if the format of print data to be registered is not supported by the print server 109 or if the image forming apparatus 104, which prints the print data, is not recognized by the print server 109, then a value "Failure" is returned for the processing.

A last task try count field 710 records how many times the last-executed task has been executed. If the task has ended when the processing result has the value "FailureRetry" (failed task that can be completed by retrying the same), then the task is to be executed again. In this case, the number of times of execution of the last-executed task is recorded. If the value of the Last Task Try Count field 710 has become a numerical value equal to or greater than a predetermined number of times, i.e., if the task has been repeatedly retried again but the processing of the task is not successfully completed, then the task is controlled as an error.

A Max Task field 711 records the number of tasks included in the corresponding job. In the present exemplary embodiment, one to twenty tasks can be included in one job. The tasks are provided with serial task numbers, such as "task 1", "task 2", and "task 3". In the present exemplary embodiment, each of task 1, task 2, and task 3 is processed in the above-described manner.

Fields from a task 1 service ID 712 to a task 20 parameter 717 manage information about the task included in the job. The task 1 service ID 712 stores the ID of the service that provides the task to be executed first. The task 1 parameter 713 stores a parameter transferred to the task when the task 1 is executed. Similarly, the task 2 service ID 714 and the task 2 parameter 715 store information about the task to be executed second. Furthermore, the task 20 service ID 716 and the task 20 parameter 717 store information about the task to be executed twentieth. The task information about twenty tasks is stored in the above-described manner. In the present exemplary embodiment, one job includes twenty tasks. However, in the present exemplary embodiment, the number of tasks that can be included in one job is not limited to a specific maximum value.

Now, a service table according to the present exemplary embodiment will be described in detail below with reference to FIG. 8. Referring to FIG. 8, a service table 800 manages a service that provides the task. As described above, the job table 700 includes information about the service to be executed. More specifically, the information about the service to be executed is described in the job table 700 in order to write the status of progress of the processing of the job and the task at timings across the task execution timing. On the other hand, to the service table 800, a definition of the service that the provider of the platform system 500 has previously received from the provider of the service is registered. In other words, the service table 800 does not manage the status information.

In the present exemplary embodiment, the term "provider of the service" (or the term "service provider") refers to a user who provides a service that utilizes the document extraction server 107, the document conversion server 108, and the print server 109. To paraphrase this, in the present exemplary embodiment, the "provider of the service" (or the term "service provider") refers to the user who provides the tasks 1 through 3. The service table 800 is stored in the table storage service 506.

FIG. 8 illustrates an example of the service table 800. Referring to FIG. 8, an ETag field 801 is similar to the ETag field 701 illustrated in FIG. 7. A partition key field 802 and a row key field 803 indicate an ID for uniquely identifying each row of the table. In the service table 800, the partition key field 802 has a fixed value "service". The row key field 803 is managed as an ID for identifying the task service. The task service will be described in detail below.

A uniform resource identifier (URI) field 804 stores a URL of the web service that provides the service. The user can utilize the service by accessing the location having the URI managed in the URI field 804. More specifically, it can be known from the service table 800 illustrated in FIG. 8 that the task whose row key field 803 has a value "service01" utilizes the function provided by the document extraction server 107 based on the URI field 804.

A type field 805 stores the service type. The service type includes "In" (input service), "Pipe" (pipe service), and "Out" (output service). The input service is a service for executing processing for acquiring data from the document server 103. More specifically, the input service is a service for inputting data from an external system. The input service is implemented by executing the task 1.

The pipe service is a service for executing processing for converting document data into print data. More specifically, the pipe service is a service for processing data. The pipe service is implemented by executing the task 2. The output service is a service for executing processing for inputting data to the print server 109 to output the data thereby. More specifically, the output service is a service for outputting data to the external system. The output service is implemented by executing the task 3.

In the present exemplary embodiment, the function for implementing various services having the type "In", "Pipe", or "Out" is referred to as the "task service". As described above, each task service is identified by the row key field 803.

The attribute field 806 stores attribute information about the task service. The attribute information is registered as information uniquely defined for each task service. For example, in a task service for acquiring data from the document server 103, information about the URI of the document server 103 is stored in the attribute field 806. In the task service for inputting a job to the print server 109, the attribute field 806 stores the information about the URI of the print server 109.

To a verification field 807, a flag is registered which indicates information about whether the quality of the service has been verified by the vendor who provides the platform before registering the service to the table. If the value of the flag is "TRUE", it is determined that the service has been verified for its quality before registration to the table. In other words, in this case, it is determined that a predetermined level of quality has been assured for the service. On the other hand, if the value of the flag is "FALSE", it is determined that the service has not been verified for its quality before registration to the table. In other words, in this case, it is determined that the level of the quality is unknown.

More specifically, in the example illustrated in FIG. 8, it is known from the table that the quality of the task service for which the row key field 803 has a value "service03" has been assured, which is indicated by the value "TRUE" set to the verification field 807. The quality of the other services has not been assured.

In other words, the quality of the service for which the verification field 807 has a value "TRUE" has been assured. Accordingly, in this case, the platform system 500 can be effectively utilized. On the other hand, the service for which the verification field 807 has a value other than the value "true" may wastefully consume the resource of the platform system 500 or may include a content or information that may attack the platform system 500.

Now, a service sequence table according to the present exemplary embodiment will be described in detail below with reference to FIG. 9. Referring to FIG. 9, a service sequence table 900 manages a service processing order. The job table 700 includes the service processing order as described above for the following purpose. To paraphrase this, the service processing order is also included in the job table 700 in order, if the back-end processing unit 402 has executed the tasks in the processing order, to write the processing status of each task and the task number of the task to be executed next at timings across the timing of execution of the task and to recognize the status of progress of the processing of each task.

On the other hand, the service sequence table 900 stores information about a combination of various services registered to the service table 800. The service sequence table 900 will be described in detail below with reference to FIG. 9. More specifically, as can be known from FIG. 9, a job that can be identified by key fields 902 and 903 having a value "sequence" "seq01" includes three tasks, as indicated in a max task field 904. Furthermore, in the example illustrated in FIG. 9, the job includes service01, service02, and service03, as indicated by fields task 1 905, task 2 906, and task 3 907. For each task service defined by the task 1 field 905, the task 2 field 906, and the task 3 field 907, the type of each task service can be identified by referring to the service table 800.

The service sequence table 900 is stored in the table storage service 506.

FIG. 9 illustrates an example of the service sequence table 900. Referring to FIG. 9, the ETag field 901 is similar to the ETag field 701 illustrated in FIG. 7. A partition key field 902 and a row key field 903 indicate an ID for uniquely identifying each row of the table. In the service sequence table 900, the partition key field 902 has a fixed value "sequence". The row key field 903 is managed as a sequence ID. The sequence ID is different from the job ID as follows. For the sequence ID, a common sequence ID is assigned to all the processing requests that have requested the same service. On the other hand, for the job ID, a unique job ID is assigned to each processing request if the same service is requested. The job ID functions as an identifier for identifying a processing request. Accordingly, the task service required for each job registered to the job table illustrated in FIG. 7 can be identified.

The max task field 904 stores a definition of the number of tasks included in the sequence. In the present exemplary embodiment, one to twenty tasks can be identified in one sequence.

The fields task 1 905 through task 20 909 manage information about the tasks included in the sequence. The task 1 field 905 stores an ID of the service (the task service) that provides a task to be executed first. Thereafter, similarly, the task 2 field 906 stores information about the second task to be executed. The service sequence table 900 stores information about twenty tasks up to the task to be executed twentieth, whose information is stored in the task 20 field 909. As described above, in the present exemplary embodiment, the maximum number of the tasks is twenty. However, a value other than twenty can be set as the maximum number of tasks.

Now, an interface implemented in the task service registered to the service table 800, i.e., the document extraction service 410, the document conversion service 411, and the spool service 412, according to the present exemplary embodiment will be described in detail below with reference to FIGS. 12A through 12C.

The task service can be largely classified into three types, i.e., "IN", "PIPE", and "OUT". A predetermined interface is implemented to each of the three types. Processing to be executed differs according to the type of the implemented task service. It is necessary that the IN type task service includes an interface illustrated in FIG. 12A. In the present exemplary embodiment, the document extraction service 410 implements the interface.

Figure 12A:
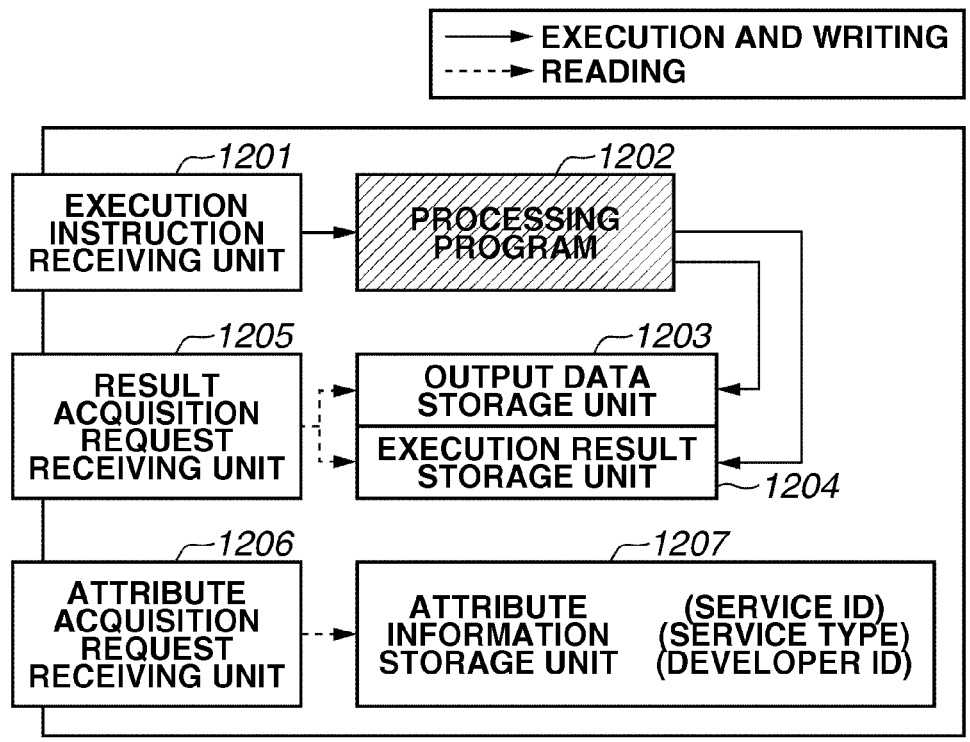
FIGS. 12A, 12B, and 12C illustrate an exemplary configuration of an interface that a service according to the first exemplary embodiment of the present invention implements.

Referring to FIG. 12A, an execution instruction receiving unit 1201 receives an instruction for executing the task and a parameter from the back-end processing unit 402. More specifically, the parameter received by the execution instruction receiving unit 1201 is the task 1 parameter 713. After receiving the task execution instruction, the execution instruction receiving unit 1201 executes a processing program 1202. After executing the processing program 1202, a task end notification is transmitted to the back-end processing unit 402 as a reply.

The processing program 1202 is a processing program designed to execute specific processing. If the task service is the IN type task service, the processing program 1202 executes processing for generating data within the web service or for acquiring data from an external server, such as the document server 103. The processing program 1202 stores the generated or acquired data in the output data storage unit 1203. In addition, the processing program 1202 stores a task execution result (the status of results, such as "Success" or "failure") in the execution result storage unit 1204. The output data storage unit 1203 is an area that stores data output as a result of executing the task. The execution result storage unit 1204 is an area that stores the task execution result (the status of results, such as "Success" or "failure").

A result acquisition request receiving unit 1205 receives a result acquisition request from the back-end processing unit 402. In addition, the result acquisition request receiving unit 1205 reads the information stored in the output data storage unit 1203 and the execution result storage unit 1204. In addition, the result acquisition request receiving unit 1205 returns data to the back-end processing unit 402.

An attribute acquisition request receiving unit 1206 acquires appropriate information from an attribute information storage unit 1207 according to an attribute acquisition request from the back-end processing unit 402. In addition, the attribute acquisition request receiving unit 1206 returns the attribute of the service. The attribute acquisition request receiving unit 1207 stores information, such as the service ID, the service type, and the developer ID. The service ID is the same as the service ID assigned at the time of registering the service to the service table 800. In other words, the sequence ID is information for uniquely identifying the service. The service type is information about the type (the IN type, the PIPE type, or the OUT type) of the task service as described above. The developer ID enables identification of the developer of the function of the task service. To paraphrase this, the developer ID corresponds to the user who has developed the task services. In the present exemplary embodiment, the IN type task service is referred to as an "acquisition task service".

Figure 12B:
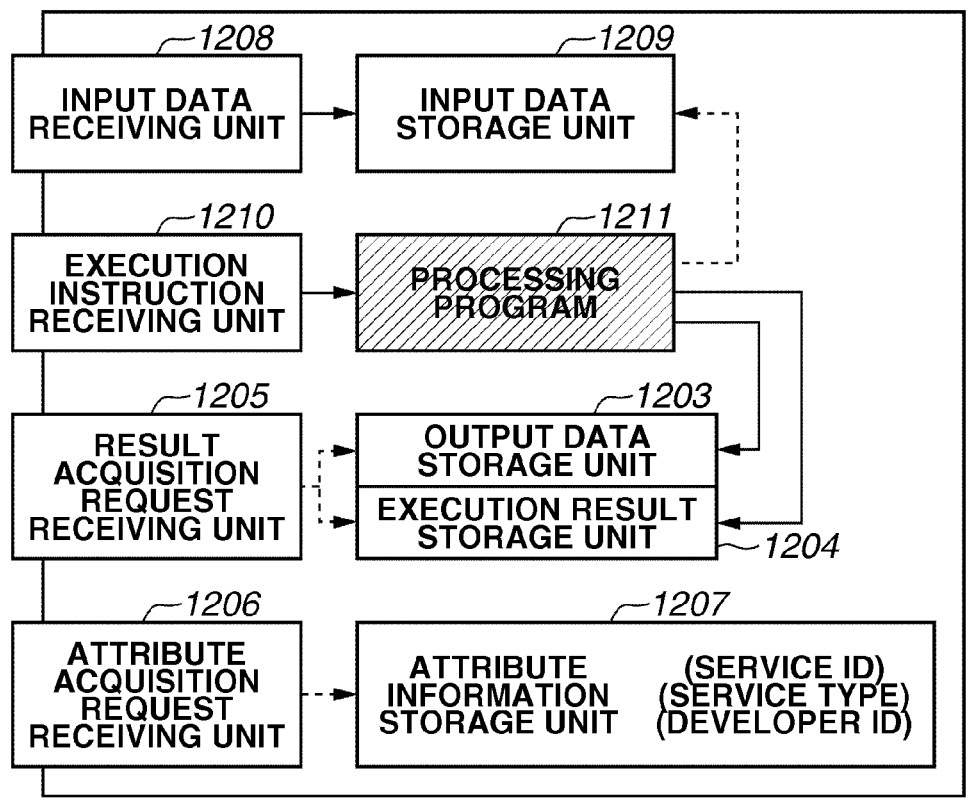

It is necessary that the PIPE type task service includes an interface illustrated in FIG. 12B. In the present exemplary embodiment, the document conversion service 411 implements the interface.

An input data receiving unit 1208 stores data transmitted according to an input data storage request from the back-end processing unit 402 in an input data storage unit 1209. The input data storage unit 1209 is an area that stores the data input to the task service. An execution instruction receiving unit 1210 receives an instruction for executing the task and a parameter from the back-end processing unit 402. After receiving the task execution instruction, the execution instruction receiving unit 1210 executes a processing program 1211. After executing the processing program 1211, a task end notification is transmitted to the back-end processing unit 402 as a reply.

The processing program 1211 is a processing program designed to execute specific processing. If the task service is the PIPE type task service, the processing program 1211 acquires data from the input data storage unit 1209 and stores processed data in the output data storage unit 1203.

In addition, the processing program 1211 stores a task execution result (the status of results, such as "Success" or "Failure") in the execution result storage unit 1204. A result acquisition request receiving unit 1205 receives a result acquisition request from the back-end processing unit 402. In addition, the result acquisition request receiving unit 1205 reads the information stored in the output data storage unit 1203 and the execution result storage unit 1204. In addition, the result acquisition request receiving unit 1205 returns data to the back-end processing unit 402. In the present exemplary embodiment, the PIPE type service is referred to as a "processing task service".

Figure 12C:
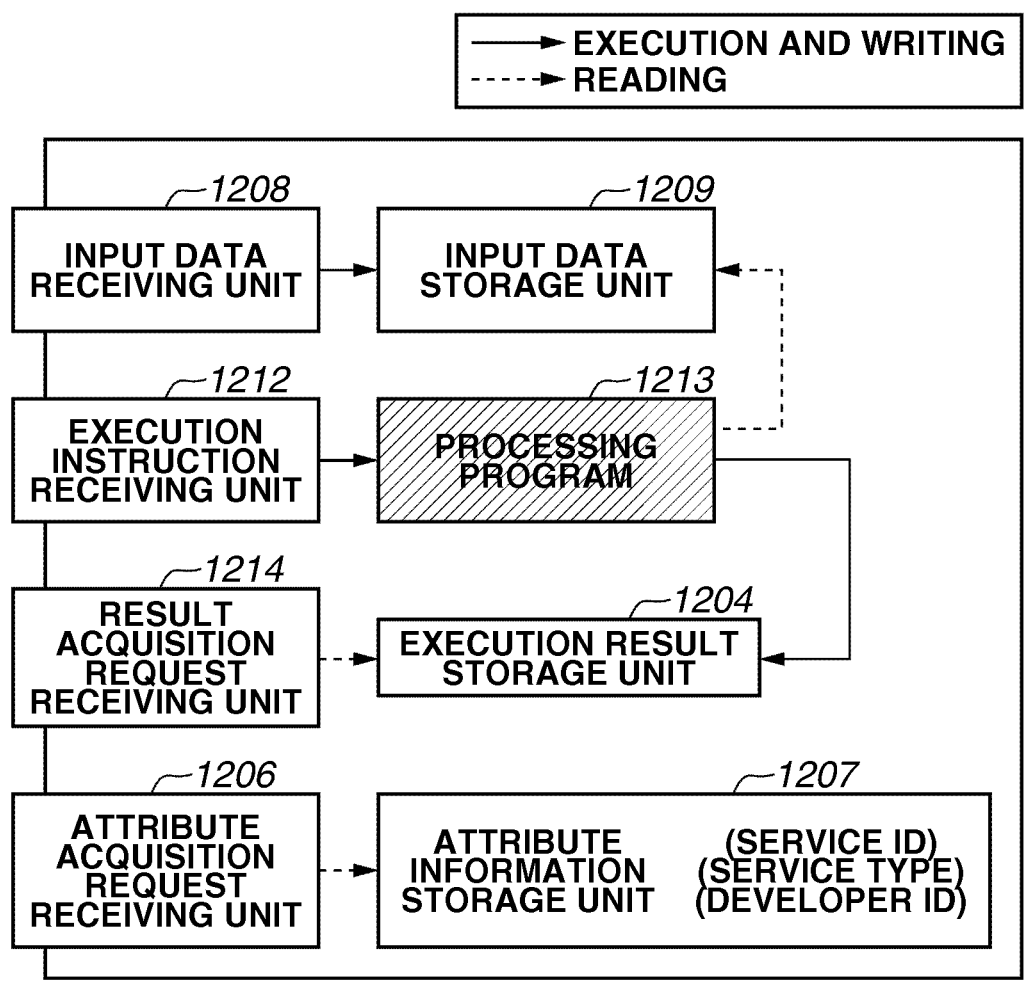

It is necessary that the OUT type task service includes an interface illustrated in FIG. 12C. In the present exemplary embodiment, the spool service 412 implements the interface. The input data receiving unit 1208 stores data transmitted according to an input data storage request from the back-end processing unit 402 in the input data storage unit 1209. The input data storage unit 1209 is an area that stores the data input to the task service.

An execution instruction receiving unit 1212 receives an instruction for executing the task and a parameter from the back-end processing unit 402. After receiving the task execution instruction, the execution instruction receiving unit 1212 executes a processing program 1213. After executing the processing program 1213, a task end notification is transmitted to the back-end processing unit 402 as a reply.

The processing program 1213 is a processing program designed to execute specific processing. If the task service is the OUT type task service, the processing program 1213 acquires data from the input data storage unit 1209 and stores and manages processed data within the spool service 412. In addition, the processing program 1213 stores a task execution result (the status of results, such as "Success" or "Failure") in the execution result storage unit 1204.

The result acquisition request receiving unit 1214 receives a result acquisition request from the back-end processing unit 402. In addition, the result acquisition request receiving unit 1214 reads the information stored in the execution result storage unit 1204. In addition, the result acquisition request receiving unit 1214 returns data to the back-end processing unit 402. In the present exemplary embodiment, an OUT type task service is referred to as a "transmission task service".

Various functions of each task service described above is implemented by the CPU 301 by loading and executing a program from the indirect storage unit 303. All of the output data storage unit 1203, the execution result storage unit 1204, and the attribute information storage unit 1207 are implemented as areas secured on the direct storage unit 302 or the indirect storage unit 303. Similarly, the input data storage unit 1209, the output data storage unit 1203, the execution result storage unit 1204, the attribute information storage unit 1207, and the input data storage unit 1209 are also implemented as areas secured on the direct storage unit 302 or the indirect storage unit 303. The three types of interfaces of "IN", "PIPE", and "OUT" types have an open specification publicized by the developer of the platform system 500.

The person who has developed the service application that utilizes the three types of interfaces requests the developer of the platform system 500 to register the information about the service application to the service table 800 and the sequence table 900. Accordingly, an exemplary embodiment of the present invention can provide the service in which the image forming apparatus 104 and the service application cooperatively operate via the platform system 500 can be provided to the user of the image forming apparatus 104.

In other words, by generating a web service that implements "IN", "PIPE", and "OUT" type interfaces, the platform system 500 is made available and the web service can be provided to the image forming apparatus 104. As a result, the service developer of the application can cause the processing programs 1202, 1211, and 1213 to cooperatively operate with the image forming apparatus 104 and the platform system 500 without publicizing the inner configuration (the know-how and the characteristic technology) thereof.

Each type task service will be described in detail below. The IN type task service generates data within the service or acquires data from an external server such as the document server 103. In other words, the IN type task service is a service that does not require input information from the platform system 500. The PIPE type task service is a service provided based on a premise that input data that has been explicitly designated by the platform system 500 is processed and a result of the processing is output to the platform system 500. The OUT type task service is a type of service provided based on the premise that input data is explicitly received from the platform system 500 and that the result of processing of the input data is to be completed within the service or to be transmitted to the external server (i.e., that the result of the processing of the data is not to be output to the platform system 500).

The three types ("IN", "PIPE", and "OUT") of service interfaces are regulated as described above. The following effects can be achieved thereby. More specifically, the application provider is allowed to easily design a sequence starting from the IN type task service and then continues to the PIPE type task service and ends at the OUT type task service and to easily call the sequence from the application. By classifying the task service into three types, the processing program can be more easily reused.

The network printing system 1000 according to the present exemplary embodiment has the above-described configuration. In the following description, an exemplary flow of processing executed within the network printing system 1000 according to the present exemplary embodiment will be described.

Figure 10B:
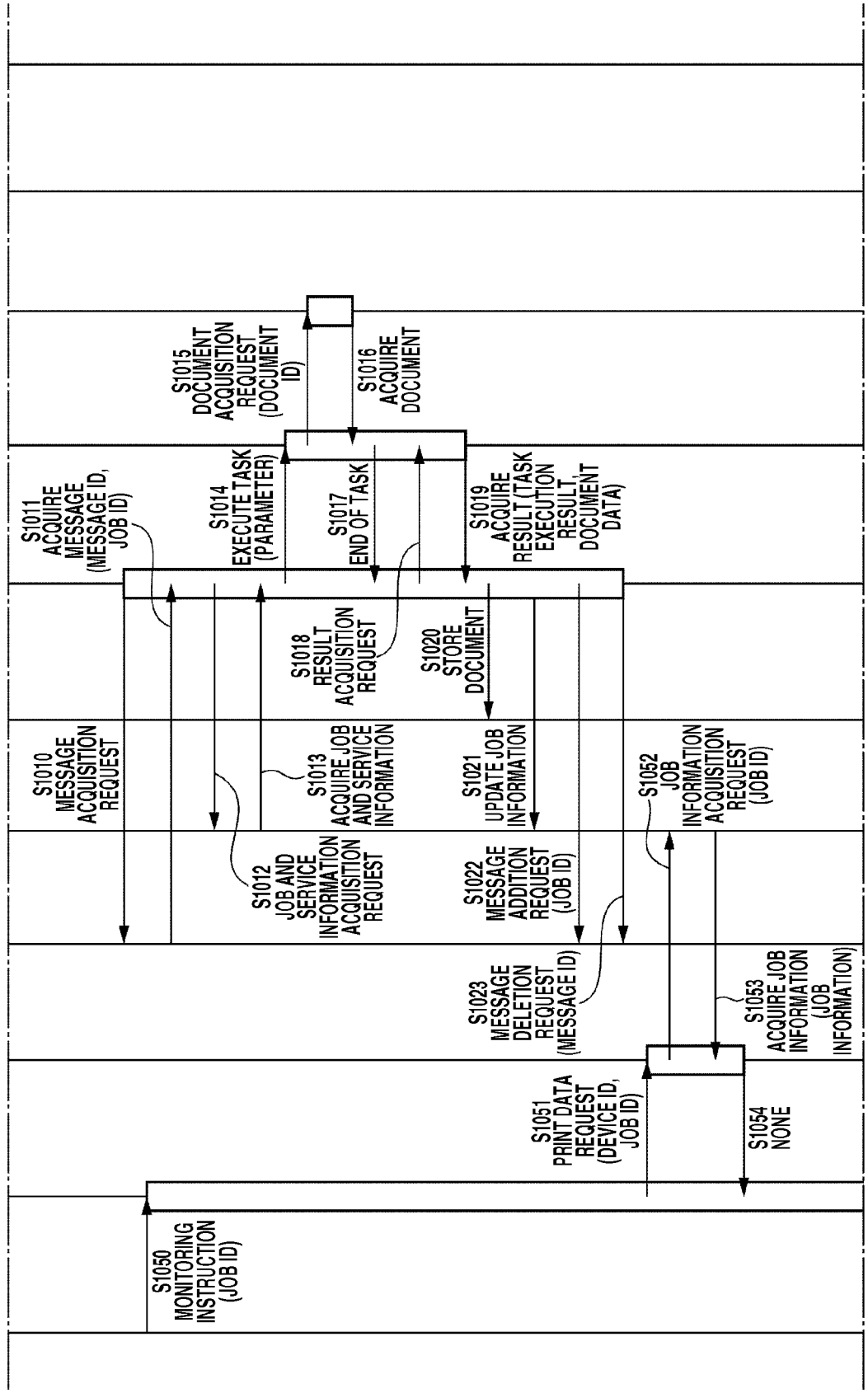
FIG. 10, composed of FIGS. 10A, 10B, 10C, and 10D, illustrates an exemplary flow of a sequence of a series of processing according to the first exemplary embodiment of the present invention.
Figure 10C:
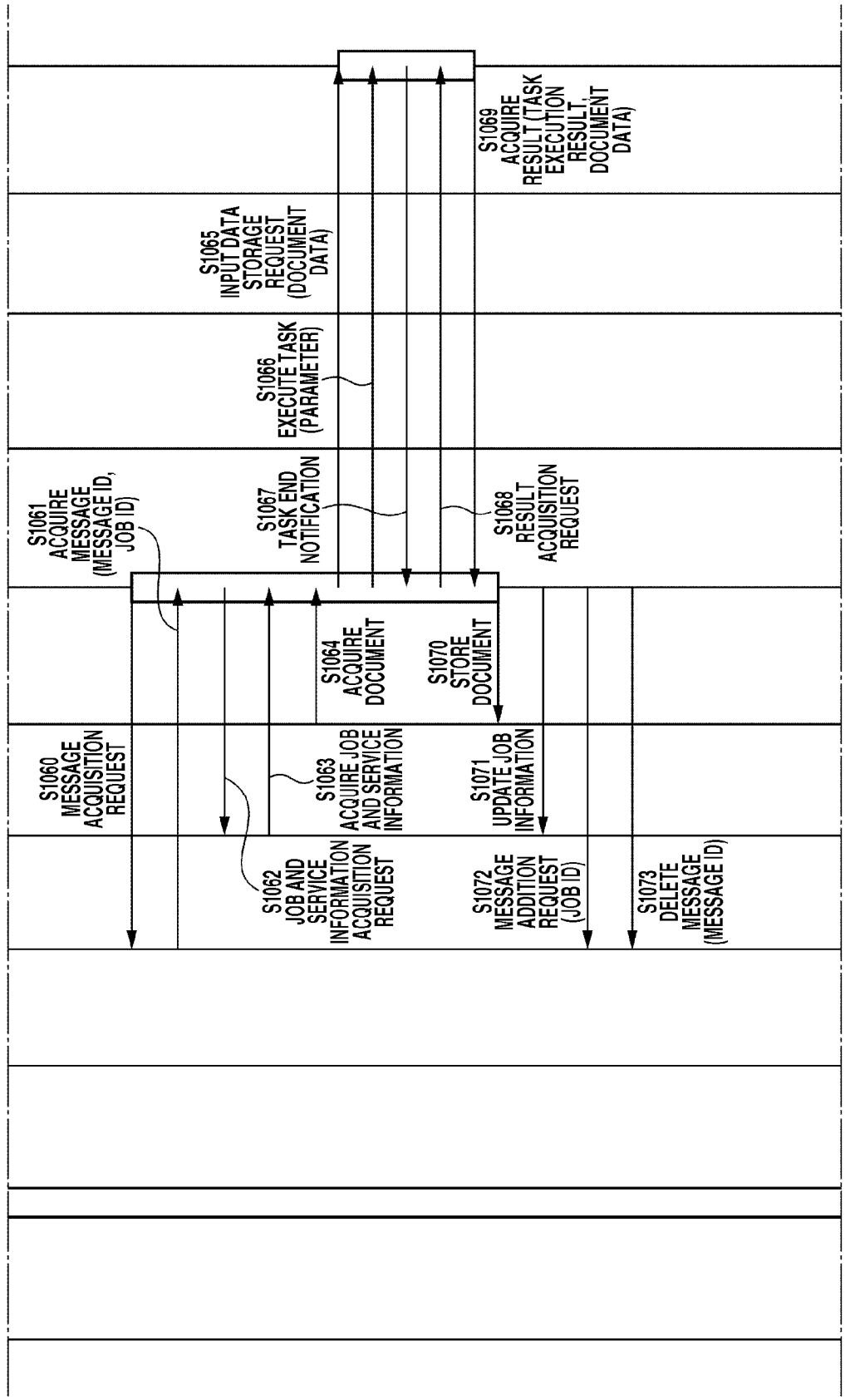

FIG. 10 is a sequence diagram illustrating an exemplary flow of processing executed within the network printing system 1000 according to the present exemplary embodiment.

A series of processing starts when the user starts the operation via the device browser 409 of the image forming apparatus 104. The device browser 409 communicates with the print application that operates on the request processing unit 401 to execute printing. In other words, as other functions of the request receiving unit 401, the request receiving unit 401 executes various functions for supporting printing.

Figure 11:
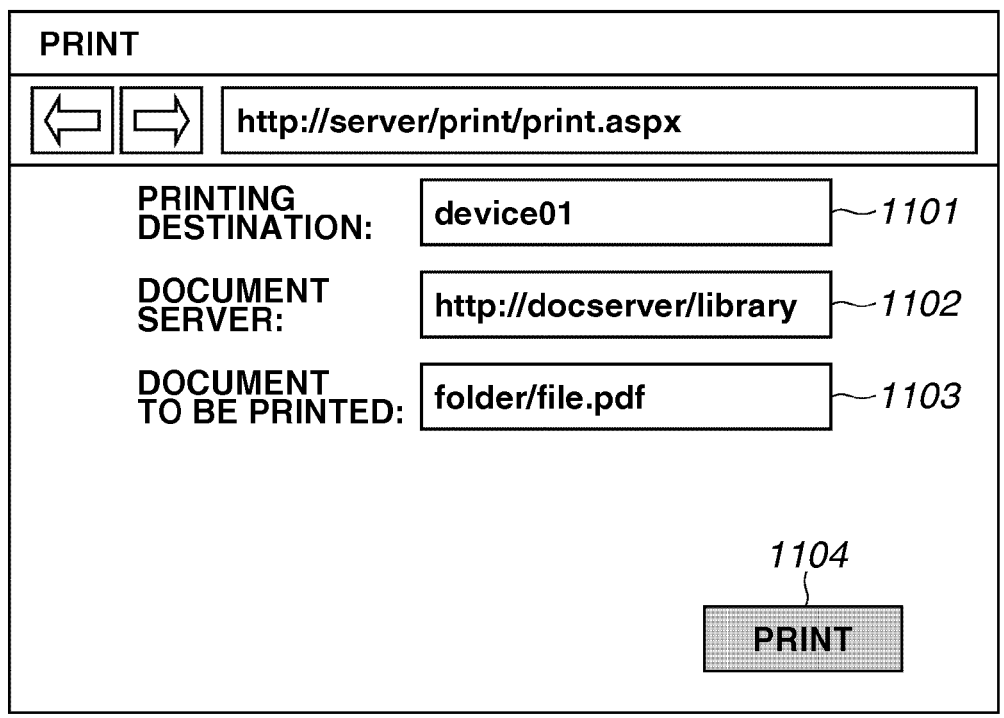
FIG. 11 illustrates an example of a print data selection screen displayed by a print application according to the first exemplary embodiment of the present invention.

FIG. 11 illustrates an example of a printing screen displayed by the device browser 409. The screen illustrated in FIG. 11 is generated by the printing application operating on the request receiving unit 401.

Referring to FIG. 11, a printing destination field 1101 displays a device ID that uniquely identifies the image forming apparatus 104 currently operated by the user. A document server field 1102 displays a URL of the document server that acquires data. In the present exemplary embodiment, the data registered to the attribute field 806 of the service table 800 is displayed in the document server field 1102.

A print target document field 1103 displays an ID of the document to be actually printed. The ID of the document is input by the user. In the example illustrated in FIG. 11, a document "folder/file.pdf" is to be printed. The document is stored in the document repository 406. The user can input an instruction for executing a previously defined print sequence by pressing a print button 1104. More specifically, the sequence ID defined by the row key field 903 of the service sequence table 900 (FIG. 9) is assigned to the print button 1104. When the user presses the print button 1104, the sequence ID is transmitted.

For example, if an ID "seq01" has been assigned as the sequence ID, the task corresponding to the ID seq01 is executed. When the print button 1104 illustrated in FIG. 11 is pressed by the user, then in step S1001, the device browser 409 inputs a print instruction request to the request receiving unit 401. When the print instruction request is input, the document ID input via the print target document field 1103, the device ID displayed in the printing destination field 1101, and the sequence ID assigned to the print button 1104 are transferred as parameters (job receiving processing).

After receiving the request, in step S1002, the request processing unit 401 inputs a sequence acquisition request to the service sequence table of the table storage service 403. The sequence acquisition request includes the sequence ID as a parameter. In step S1003, the table storage service 403 transmits requested sequence data of the sequence ID to the request processing unit 401 in response to the input request. In the present exemplary embodiment, "sequence data" refers to information included in various types of tasks defined by the service sequence table 900.

In step S1004, the request processing unit 401 inputs a job addition request to the job table 700 stored by the table storage service 403. In inputting the job addition request, the request receiving unit 401 transmits the sequence data as a parameter and parameter data, such as a document ID, to the table storage service 403.

In step S1005, the table storage service 403 executes job generation and addition processing based on the parameter received from the request receiving unit 401. Furthermore, the table storage service 403 returns the ID of the generated job to the request receiving unit 401. The ID of the generated job is identified by the partition key field 702 and the row key field 703.

In step S1006, the request receiving unit 401 transmits a message addition request to the queue storage service 405. More specifically, by inputting the message addition request, the request receiving unit 401 transmits the job ID acquired in step S1005 as a parameter. The queue storage service 405 executes message addition processing.

In the present exemplary embodiment, the message to be added in step S1006 is the queue message 600. Furthermore, the job ID transmitted as a parameter is, more specifically, the value of the portion <QueueMessage> 603 included in the queue message 600.

In step S1007, in response to the request input in step S1001, the request receiving unit 401 acquires the job ID via the device browser 409. By executing the above-described processing, the print instruction operation input by the user is completed. Now, processing executed by the platform application 408 for acquiring print data will be described.

After acquiring the job ID in step S1007, the processing advances to step S1050. In step S1050, the device browser 409 inputs a monitoring instruction to the platform application 408. In inputting the monitoring instruction, the device browser 409 transmits the job ID to the platform application 408 as a parameter. In step S1051, the platform application 408 requests the request receiving unit 401 to transmit print data. In inputting the print data transmission request, the platform application 408 transmits the job ID and the device ID to the request receiving unit 401 as parameters.

In step S1052, the request receiving unit 401 inputs a job information acquisition request to the table storage service 403. In the job information acquisition request processing in step S1052, the request receiving unit 401 transmits the job ID that has been received in step S1051 to the table storage service 403.

The table storage service 403 searches for a job corresponding to the job ID whose acquisition has been requested. Furthermore, the table storage service 403 transmits a result of the searching to the request receiving unit 401 as a reply.

After receiving the job information, the request receiving unit 401 determines whether the processing of the job has been already completed by referring to the Status field 706, which indicates the status of progress of the job.

In the present exemplary embodiment, at the timing of receiving the reply in step S1053, the processing of a job job01 is in progress. Accordingly, in step S1054, the request receiving unit 401 transmits a reply to the platform application 408 indicating that no print data is present.

The platform application 408 repeats the processing for requesting transmission of print data until print data is acquired. In step S1055, the platform application 408 executes the repeated request for transmitting print data. The print data requesting processing in step S1055, the job information requesting processing in step S1056, and the job information acquisition processing in step S1057 correspond to the processing in step S1051, S1052, and S1053, respectively.

In the present exemplary embodiment, the job has already been completely processed at the timing of transmitting the response in step S1057. Accordingly, in step S1058, the request receiving unit 401 inputs a print data acquisition request to the spool service 412. In the print data acquisition request, the request receiving unit 401 transmits the job ID and the device ID to the spool service 412 as parameters.

The spool service 412 checks the presence or absence of data corresponding to the designated job ID and device ID. If it is determined that any data corresponding to the designated job ID and device ID is present, then the processing advances to step S1059. In step S1059, the spool service 412 transmits the print data to the request receiving unit 401.

After receiving the reply from the spool service 412, in step S1059A, the request receiving unit 401 transmits the print data to the platform application 408. The platform application 408 executes control for printing out the print data by using the printing unit of the image forming apparatus 104. The network printing system 1000 according to the present exemplary embodiment executes the above-described processing flow from the user input of a print request to the output of a print product on the image forming apparatus 104.

In the following description, a cooperated operation between the platform system 500 and various web services will be described in detail. In step S1010, the back-end processing unit 402 periodically inputs the message acquisition request to the queue storage service 405. After acquiring a message from the queue in step S1011, the back-end processing unit 402 extracts a job ID from the portion <MessageText> 603.

In step S1012, the back-end processing unit 402 inputs a job and service information acquisition request to the table storage service 403. After receiving the job and service information acquisition request, the table storage service 403 acquires information about the job corresponding to the job ID by referring to the job table 700.

In step S1013, the table storage service 403 acquires an ID of the task service corresponding to the task to be executed next from the job information. In addition, the table storage service 403 acquires the service information corresponding to the ID of the task service from the service table 800 based on the ID of the acquired task service. Moreover, the table storage service 403 returns the job and service information to the back-end processing unit 402 as a reply to the request input in step S1012. The task to be executed next can be identified by referring to the information about the task that has been executed last.

In step S1014, the back-end processing unit 402 inputs an instruction for executing the task based on the acquired job and service information. In executing the task, the back-end processing unit 402 transfers the parameter managed by the job table 700 as an argument. In the present exemplary embodiment, the back-end processing unit 402 inputs the task execution instruction to the execution instruction receiving unit 1201 of the document extraction service 410.

After receiving the task execution instruction, the execution instruction receiving unit 1201 executes the processing program 1202. In step S1015, in executing the task by using the processing program 1202, a document acquisition request is transmitted to the document repository 406. In transmitting the document acquisition request, the document extraction service 410 transfers the document ID to the document repository 406 as a parameter. The URL of the document repository 406 and the document ID are based on the information about the parameter received from the back-end processing unit 402 in step S1014.

After the document repository 406 has received the document acquisition request in step S1015, the processing advances to step S1016. In step S1016, the document repository 406 transfers the document data corresponding to the designated document ID to the processing program 1202 of the document extraction service 410.

The processing program 1202 stores the received document data on the output data storage unit 1203. In addition, the processing program 1202 stores the result of executing the processing (an execution result status, such as "Success" or "Failure") on the execution result storage unit 1204. Then, the processing program 1202 ends.

When the processing program 1202 ends, then in step S1017, the execution instruction receiving unit 1201 returns the task end notification to the back-end processing unit 402 as the reply to the instruction input in step S1014.

In step S1018, the back-end processing unit 402 transmits a result acquisition request to the result acquisition request receiving unit 1205 of the document extraction service 410. The result acquisition request receiving unit 1205 reads the document data from the output data storage unit 1203 and the result status from the execution result storage unit 1204.

In step S1019, the result acquisition request receiving unit 1205 returns the read document data and the result status to the back-end processing unit 402 as a reply to the request received in step S1018. After receiving the reply, in step S1020, the back-end processing unit 402 executes document storage processing to store the document data in the blob storage service 404.

In step S1021, the back-end processing unit 402 executes job information updating processing. More specifically, the back-end processing unit 402 applies the task execution result to the job table 700 of the table storage service 403. In the above-described manner, the task 1 is completely processed.

After a series of processing of the task has been completed, the back-end processing unit 402 adds and deletes the message to and from the queue storage service 405 to execute the next task (i.e., the task 2).

More specifically, at first, in step S1022 (message addition request processing), the back-end processing unit 402 adds a message corresponding to the job ID of the currently executed job to the queue storage service 405. By executing the processing in step S1022, the request for processing the task to be processed has been completely input. In step S1023 (message deletion request processing), the back-end processing unit 402 deletes the currently processed message from the queue storage service 405. Accordingly, the message that instructs the execution of the processed task is deleted from the queue. After that, processing for re-executing the same processing, which may have been suspended due to time-out, would not be executed.

Now, the processing executed by the task 2 will be described in detail below with reference to FIG. 10. Processing in steps S1060 through S1063 is similar to that in steps S1010 through S1013.

In step S1064, the back-end processing unit 402 acquires the document data from the blob storage service 404 based on the acquired job information and service information. More specifically, in the present exemplary embodiment, the back-end processing unit 402 acquires the document stored in step S1020.

In step S1065, the back-end processing unit 402 transmits an input data storage request to the input data receiving unit 1208 of the document conversion service 411. In transmitting the input data storage request, the back-end processing unit 402 transfers the document data acquired in step S1064 as an argument.

By receiving the input data storage request, the input data receiving unit 1208 receives the document data transferred as the argument. Furthermore, the input data receiving unit 1208 stores the received document data in the input data storage unit 1209.

In step S1066, the back-end processing unit 402 transmits a task execution instruction to the execution instruction receiving unit 1210 of the document conversion service 411. In transmitting the task execution instruction, the back-end processing unit 402 transmits the parameter managed by the job table 700 to the execution instruction receiving unit 1210 as an argument.

After receiving the task execution instruction, the execution instruction receiving unit 1210 executes the processing program 1211. When the processing program 1211 is executed, the execution instruction receiving unit 1210 executes predetermined data conversion on the data stored on the input data storage unit 1209 and stores a result of the conversion on the output data storage unit 1203.

In the present exemplary embodiment, it is supposed that the data acquired in step S1015 is a document generated by using an office application, such as word processor. Accordingly, by executing the processing program 1211, the document generated by an office application is converted into PDF data, which can be processed by the image forming apparatus 104.

In addition, the processing program 1211 stores the result of executing the processing (an execution result status, such as "Success" or "Failure") on the execution result storage unit 1204. Then the processing program 1211 ends.

When the processing program 1211 ends, then in step S1067, the execution instruction receiving unit 1201 returns the task end notification to the back-end processing unit 402 as the reply to the instruction input in step S1066. In step S1068, the back-end processing unit 402 transmits a result acquisition request to the result acquisition request receiving unit 1205 of the document conversion service 411.

In step S1069, the result acquisition request receiving unit 1205 returns the read document data and the result status to the back-end processing unit 402 as a reply to the request received in step S1018.

After receiving the reply, in step S1070 the back-end processing unit 402 stores the document data in the blob storage service 404. In step S1071, in executing the job information updating processing, the back-end processing unit 402 stores the task execution result in the job table 700 of the table storage service 403. By executing the above-described processing, the task 2 is completely processed.

After a series of processing of the task has been completed, the back-end processing unit 402 adds and deletes the message to and from the queue storage service 405 to execute the next task (i.e., the task 3). More specifically, at first, in step S1072, the back-end processing unit 402 adds a message corresponding to the job ID of the currently executed job to the queue storage service 405. By executing the processing in step S1072, the request for processing the task to be processed has been completely input. In step S1073 (message deletion request processing), the back-end processing unit 402 deletes the currently processed message from the queue storage service 405. Accordingly, the message that instructs the execution of the processed task is deleted from the queue. After that, processing for re-executing the same processing, which may have been suspended due to time-out, would not be executed.

The description of the task execution sequence is continued. Subsequently to the above-described processing, processing of the task 3 is executed. Processing in steps S1030 through S1033 is similar to that in steps S1010 through S1013.

In step S1034, the back-end processing unit 402 acquires the document data from the blob storage service 404 based on the acquired job information and service information. More specifically, in the present exemplary embodiment, the back-end processing unit 402 acquires the document stored in step S1070.

In step S1041, the back-end processing unit 402 transmits an input data storage request to the input data receiving unit 1208 of the spool service 412. In transmitting the input data storage request, the back-end processing unit 402 transfers the document data acquired in step S1034 as an argument.

By receiving the input data storage request, the input data receiving unit 1208 receives the document data transferred as the argument. Furthermore, the input data receiving unit 1208 stores the received document data in the input data storage unit 1209.

In step S1035, the back-end processing unit 402 transmits a task execution instruction to the execution instruction receiving unit 1212 of the spool service 412. In transmitting the task execution instruction, the back-end processing unit 402 transmits the parameter managed by the job table 700 to the execution instruction receiving unit 1212 as an argument.

The task execution instruction transmitted in step S1035 is received by the execution instruction receiving unit 1212 of the spool service 412. When the task execution instruction is received, then the processing program 1213 is executed. After executing the processing program 1213, the processing program 1213 acquires the data from the input data storage unit 1209. Furthermore, the processing program 1213 generates and assigns an attribute necessary for printing the instructed data on the image forming apparatus 104 (i.e., information such as a print priority or tint information).

In the present exemplary embodiment, the processing program 1213 of the spool service 412 receives the device ID of the printing destination apparatus and the job ID as parameters and manages print data in association with the parameter values. In addition, the processing program 1213 stores the processing execution result (the execution result status such as "Success" or "Failure") in the execution result storage unit 1204. Then the processing program 1213 ends.

After the processing program 1213 is completely executed, in step S1036, the execution instruction receiving unit 1212 returns a task end notification to the back-end processing unit 402 as a reply to the instruction input in step S1035. In step S1037, the back-end processing unit 402 transmits a result acquisition request to the result acquisition request receiving unit 1214 of the spool service 412.

The result acquisition request receiving unit 1214 reads the result status stored on the execution result storage unit 1204. In step S1038, the result acquisition request receiving unit 1214 returns the result status to the back-end processing unit 402 as a reply to the request received in step S1037.

After receiving the reply, in step S1039, the back-end processing unit 402 stores the task execution result in the job table 700 of the table storage service 403 by executing the job information updating processing. By executing the above-described processing, the task 3 is completely processed.

In the present exemplary embodiment, the processing of the job ends when print data is added. Accordingly, after a series of processing of the task has been completed, the back-end processing unit 402 deletes the message from the queue storage service 405. More specifically, when a message deletion request is transmitted in step S1040, the currently processed message is deleted from the queue storage service 405. Accordingly, the message corresponding to the processed task is deleted from the queue. Then the job ends. The network printing system 1000 according to the present exemplary embodiment executes the above-described processing.

According to the present exemplary embodiment, the following effects can be achieved by implementing the interfaces illustrated in FIGS. 12A through 12C.

The present exemplary embodiment having the above-described configuration can provide a service for cooperating with the image forming apparatus 104 by utilizing the platform, such as the platform system 500, without publicizing the know-how and the characteristic technology of the processing programs 1202, 1211, and 1213.

In the present exemplary embodiment, the service registered to the job table 700 is simply executed. However, because a service application is generated based on an open specification, the quality of service applications may not be uniform. If the service provided by a service providing apparatus does not have a sufficiently high quality, the service not only wastefully consumes the resource of the platform system 500 but also causes the user of the image forming apparatus 104 to feel annoyed.

This is because a result of a service that may fail a plurality of number of times may hardly be a result desired by the user. Accordingly, for a service application that may not satisfy a predetermined level of quality, the following solution may be useful.

Because it is likely that the above-described service may fail if executed, the job is suspended without executing the task of the service application having a quality not high enough to satisfy a quality standard to increase the quality of the entire printing system 1000. Accordingly, it becomes easier for the user to execute the desired service. Therefore, the reliability of the network printing system 1000 can increase.

In a second exemplary embodiment of the present invention, a service quality statistical table 1300 illustrated in FIG. 13 is provided. Whether to execute a task is determined based on information stored in the service quality statistical table 1300. To begin with, the service quality statistical table 1300 according to the present exemplary embodiment will be described in detail below.

The service quality statistical table 1300 manages statistical information about a result of executing the service. The service quality statistical table 1300 is stored by the table storage service 506. FIG. 13 illustrates an example of the service quality statistical table 1300.

Referring to FIG. 13, an ETag field 1301 is similar to the ETag field 701 illustrated in FIG. 7. A partition key field 1302 and a row key field 1303 indicate an ID for uniquely identifying each row of the table. In the service quality statistical table 1300, the partition key field 1302 is a developer ID, which can uniquely identify the developer of the service. The row key field 1303 is managed as a service ID for uniquely identifying a task service.

An exec count field 1304 stores a numerical value that indicates the number of times of execution of the task service. An error count field 1305 stores a numerical value that indicates the number of errors that have occurred when the task service has been executed.

In the present exemplary embodiment, the service quality statistical table 1300 manages previously compiled data. However, alternatively, an execution result can be stored every time a job is executed and the stored information can be compiled when the information has become necessary or immediately before the information becomes necessary.

In the present exemplary embodiment, the statistical information can be updated when the job information is updated in step S1021 (FIG. 10). More specifically, the back-end processing unit 402 transmits a task execution instruction together with the job information to be updated in step S1021 as a part thereof. At the same time, the table storage service 403 also updates the information included in the service quality statistical table 1300. However, the statistical information can be updated at another different timing for updating the job information. In other words, the statistical information can be updated at the timing of executing step S1071 or S1039 illustrated in FIG. 10.

In addition, in the present exemplary embodiment, the job information is updated as described above with reference to the job table 700 illustrated in FIG. 7. To paraphrase this, the count value of the task and the job that have not been successfully processed is incremented.

The other part of the configuration of the network printing system 1000 not described above is similar to that described above in the first exemplary embodiment of the present invention.

Figure 14:
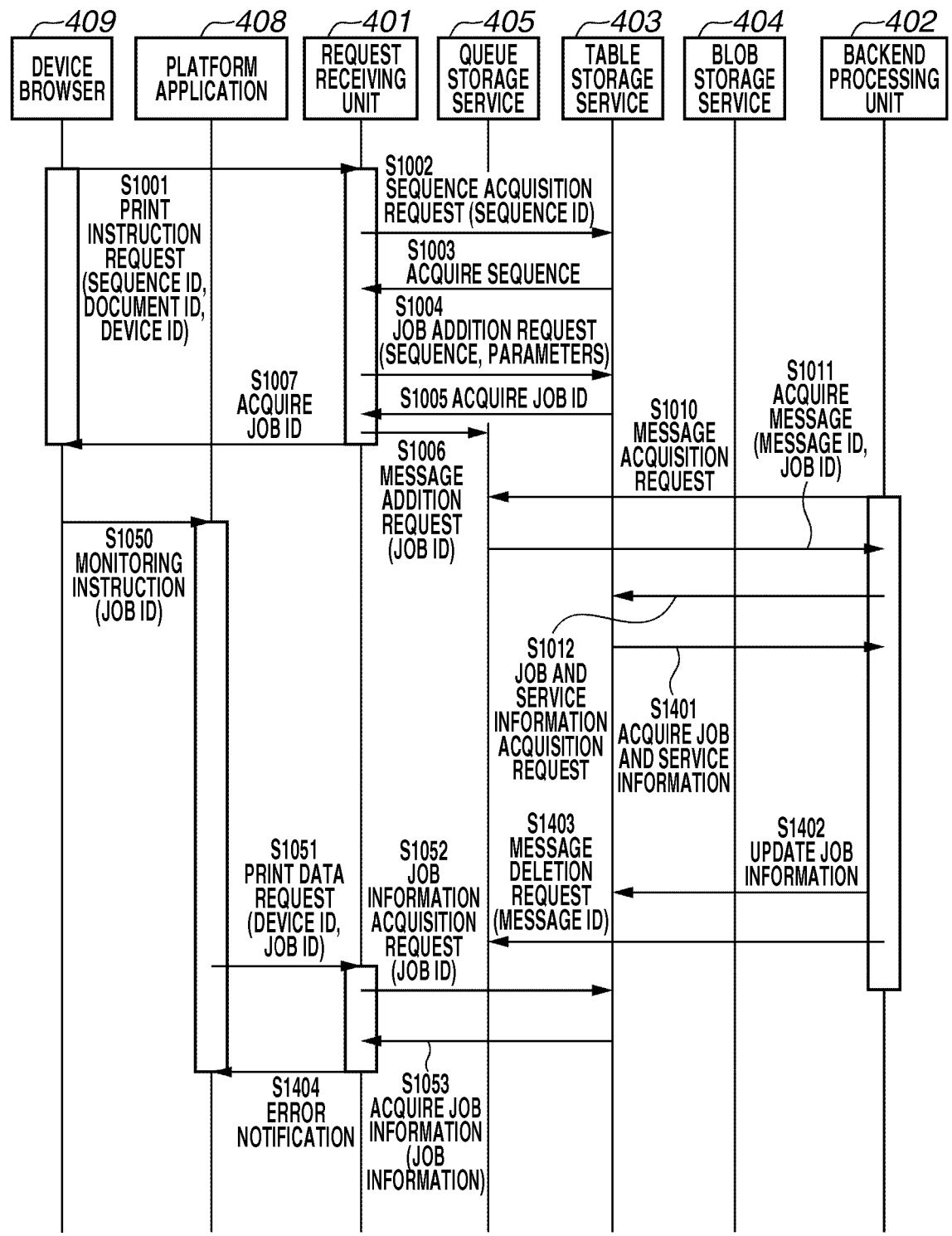
FIG. 14 illustrates an exemplary flow of a sequence of a series of processing according to a second exemplary embodiment of the present invention.

The present exemplary embodiment executes the following processing illustrated in the sequence diagram of FIG. 14. Processing in steps S1001 through S1012 is similar to that illustrated in FIG. 10.

In step S1012, the back-end processing unit 402 transmits the job and service information acquisition request to the table storage service 403. More specifically, the back-end processing unit 402 requests acquisition of service quality statistical information as well as the job information and the task service information. To paraphrase this, the back-end processing unit 402 acquires statistical information corresponding to the ID of the task service (the exec count field 1304 and the error count field 1305) from the service quality statistical table 1300.

The exec count field 1304 indicates the number of times of execution of the task. The error count field 1305 indicates the number of times of failures of the executed task. The job information and the task service information are as described above.

In step S1401, the table storage service 403 returns the job information, the service information, and the service quality statistical information to the back-end processing unit 402 as a reply to step S1012.

After acquiring the service quality statistical information, the back-end processing unit 402 determines whether the acquired quality statistical information satisfies a predetermined reference value.

Figure 15:
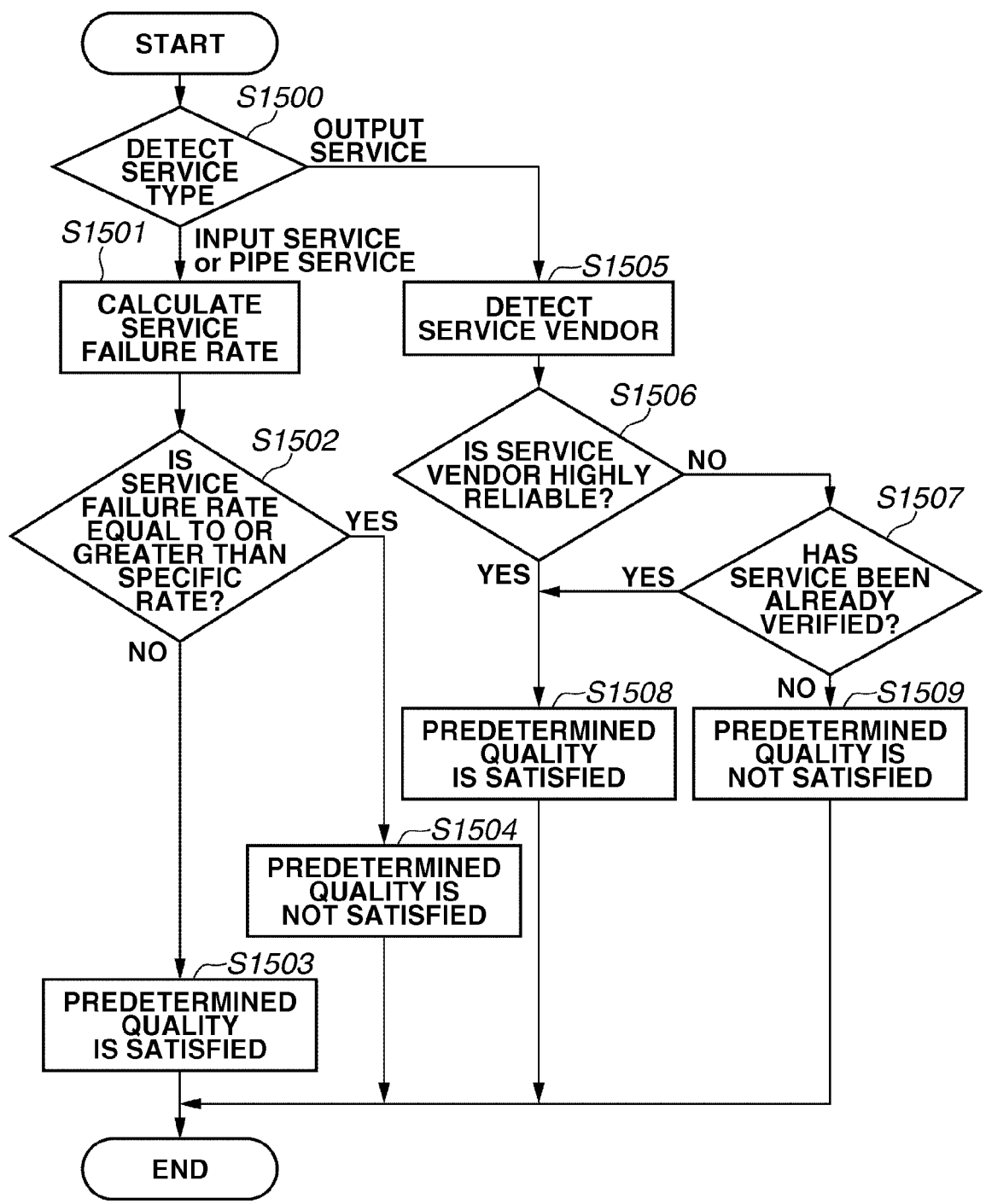
FIG. 15 is a flow chart illustrating an exemplary flow of service quality determination processing according to the second exemplary embodiment of the present invention.

FIG. 15 is a flow chart of a logic for determining whether the service to be called satisfies a predetermined quality based on the service quality statistical information, which is executed by the back-end processing unit 402.

Referring to FIG. 15, in step S1500, the back-end processing unit 402 detects the type of the service. In addition, the back-end processing unit 402 determines the service to be called is an OUT type task service.

The service type is detected in the following manner. More specifically, the back-end processing unit 402 transmits a request to the attribute acquisition request receiving unit 1206. The attribute acquisition request receiving unit 1206 reads the service type from the attribute information storage unit 1207 and transmits a reply.

If it is determined that the service type is an INPUT service or a PIPE service as a result of the determination of the service type, then the processing advances to step S1501. The "predetermined reference value" refers to a failure rate indicating the ratio of the number of failures to the total number of times of executing the job.

The back-end processing unit 402 calculates the failure rate in step S1501. More specifically, the back-end processing unit 402 calculates the failure rate by using the following expression:

$$\text{Failure rate} = \text{error count}(1305)/\text{exec count}(1304) \times 100$$

In step S1502, the back-end processing unit 402 determines whether the failure rate is less than the predetermined reference value. If the reference value (the threshold value) is 20%, then in step S1503, it is regarded that the condition is satisfied if the failure rate is less than 20%. If, on the other hand, it is determined in step S1502 that the failure rate is 20% or greater, it is regarded in step S1504 that the condition is not satisfied.

In step S1500, on the other hand, if it is determined that the type of the service to be called is the OUT type task service, then the processing advances to step S1505. In step S1505, the back-end processing unit 402 detects the developer of the service to be called. To detect the service developer, the back-end processing unit 402 inputs a request to the attribute acquisition request receiving unit 1206, and the attribute acquisition request receiving unit 1206 reads the developer ID from the attribute information storage unit 1207 and transmits the read information as a reply.

In step S1506, the back-end processing unit 402 determines whether the reliability of the vendor is high based on the detected developer ID. The determination in step S1506 is executed as follows. More specifically, at first, the back-end processing unit 402 calculates the total number of the error counts (1305) (i.e., the total number of errors) and the total number of the exec counts 1304 (i.e., the total number of times of execution) of all the services developed by the developer.

Then, the back-end processing unit 402 calculates the total failure rate by using the following expression:

Total failure rate=total number of times of failures/ total number of times of execution×100

In step S1506, the back-end processing unit 402 determines whether the total failure rate calculated by using the above-described expression is less than the predetermined reference value. Furthermore, based on a result of the determination, the back-end processing unit 402 determines whether the reliability of the vendor is high.

For example, when the reference value of 20% has been set, the back-end processing unit 402 determines, in step S1506, that the condition is satisfied if the failure rate is less than 20%. On the other hand, if the failure rate is 20% or greater, then the back-end processing unit 402 determines that the condition is not satisfied.

If it is determined that the determination reference condition is not satisfied (NO in step S1506), then in step S1507, the back-end processing unit 402 determines whether the service has been already verified. If it is determined that the service has been already verified (YES in step S1507), then the processing advances to step S1508, in which the back-end processing unit 402 determines that the predetermined level of quality has been achieved. On the other hand, if it is determined that the service has not been verified yet (NO in step S1507), then the processing advances to step S1509, in which the back-end processing unit 402 determines that the predetermined quality has not been achieved.

If the above-described determination reference condition is satisfied, the processing in steps S1014 through S1019 in the sequence diagram illustrated in FIG. 10 is executed. On the other hand, if the determination reference condition is not satisfied, the job information updating processing in step S1402 in the sequence diagram illustrated in FIG. 14 is executed.

More specifically, by updating the job information and changing the value of the Status field 706 included in the job table 700 to "Failure" in step S1402, the back-end processing unit 402 executes control for clearly indicating that the job has failed. In other words, the job is regarded as having failed.

The back-end processing unit 402 deletes the message processed by the current processing from the queue storage service 405 according to the message deletion request received in step S1403. By executing the above-described processing, the job is not to be processed afterwards. The above-described processing is executed to prevent adverse execution of the service whose quality has not achieved the predetermined level.

Now, processing executed by the platform application 408 for acquiring print data will be described with reference to FIG. 14. Referring to FIG. 14, processing in steps S1050 through S1053 illustrated in FIG. 14 is similar to that illustrated in FIG. 10.

The request receiving unit 401 can determine that the processing has failed by referring to the Status field 706 acquired in step S1053. Accordingly, in step S1404, the request receiving unit 401 transmits an error notification to the platform application 408. When the error notification is received, the platform application 408 suspends the processing.

According to the present exemplary embodiment, the execution of the service whose quality has not reached a predetermined quality can be suspended. Therefore, the present exemplary embodiment can effectively utilize system resources.

As illustrated in FIGS. 12A through 12C, each of the above-described exemplary embodiments of the present invention includes a request receiving unit, which has a unique function, for each of IN, PIPE, and OUT type services. However, a plurality of request receiving units can be used in a unified manner.

Figure 16A:
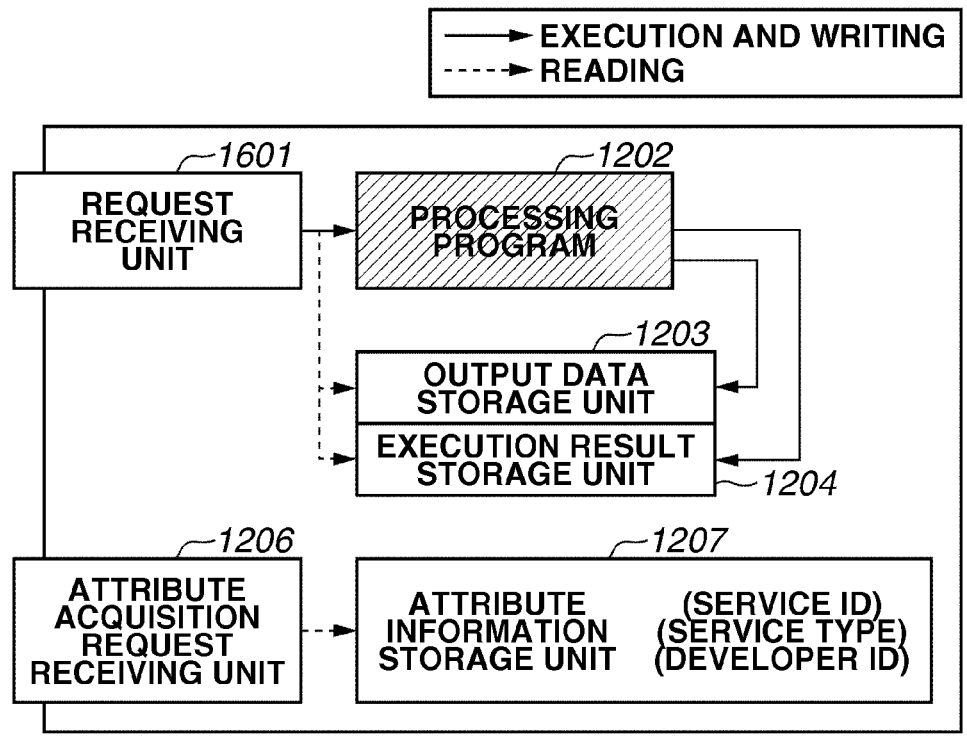
FIGS. 16A, 16B, and 16C illustrate an exemplary configuration of an interface that a service according to a modification of the present invention implements.

More specifically, in the example illustrated in FIG. 16A, the functions of the execution instruction receiving unit 1201 and the result acquisition request receiving unit 1205 are combined into a request receiving unit 1601. In this example, as a result of the task execution instruction transmitted from the back-end processing unit 402 in step S1014, the request receiving unit 1601 receives the execution instruction, executes the processing corresponding to the execution instruction receiving unit 1201, and then executes the processing corresponding to the result acquisition request receiving unit 1205.

The back-end processing unit 402 receives a reply equivalent to that transmitted in step S1019 as a reply to the instruction transmitted in step S1014. In other words, in this case, the processing equivalent to steps S1017 and S1018 is not executed.

Figure 16B:
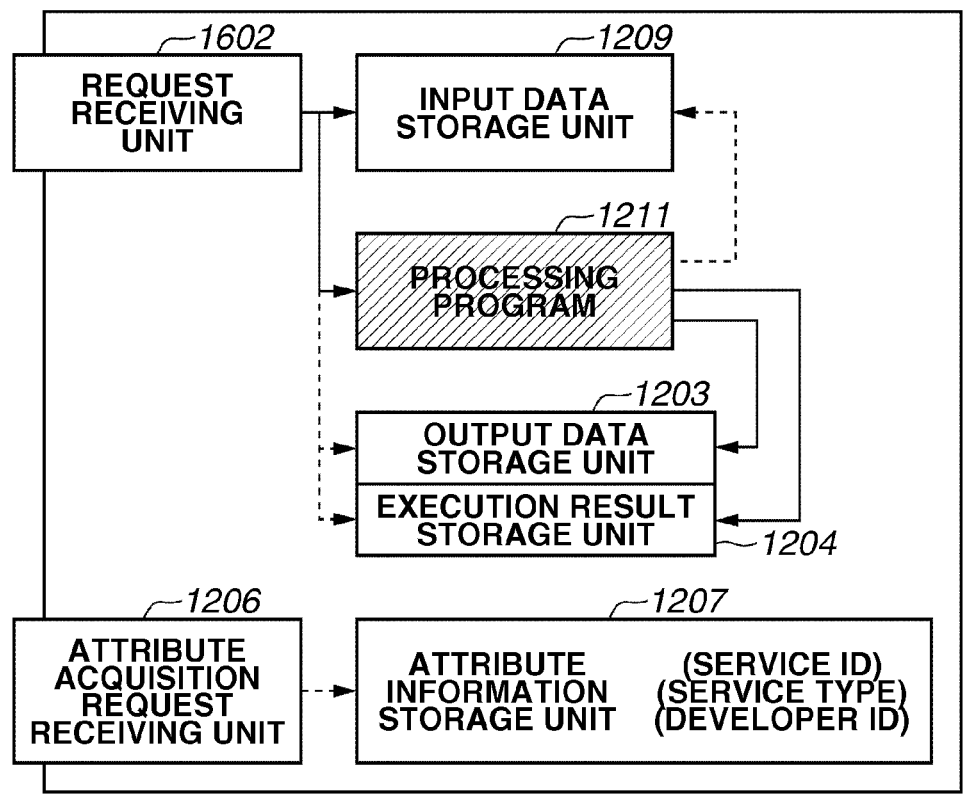

In the example illustrated in FIG. 16B, the functions of the input data receiving unit 1208, the execution instruction receiving unit 1210, and the result acquisition request receiving unit 1205 are combined into a request receiving unit 1602.

In this case, when the back-end processing unit 402 executes the processing in step S1065, the request receiving unit 1602 serially executes the processing corresponding to the input data receiving unit 1208, the execution instruction receiving unit 1210, and the result acquisition request receiving unit 1205.

The back-end processing unit 402 receives a reply equivalent to that transmitted in step S1069 as a reply to the request transmitted in step S1065. In other words, in this case, the processing equivalent to steps S1066 through S1068 is not executed.

Figure 16C:
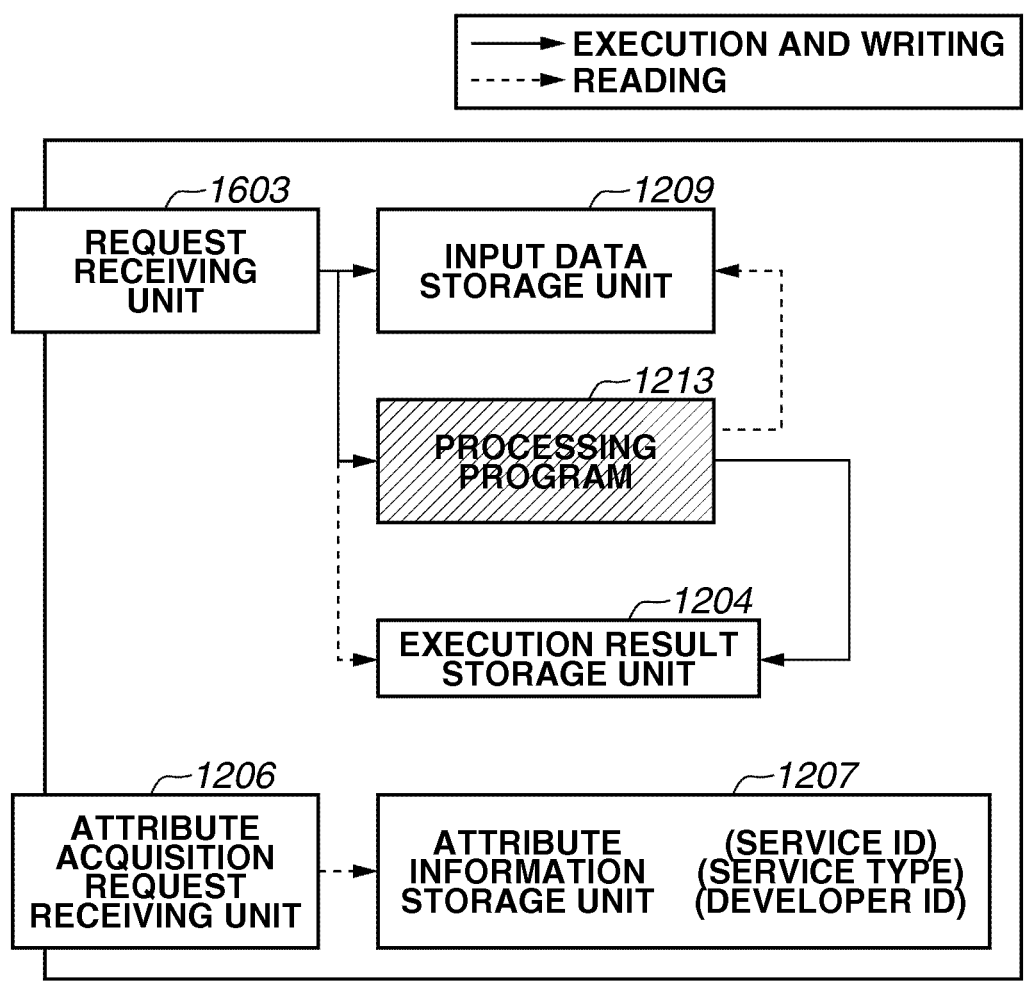

Similarly, in the example illustrated in FIG. 16C, the functions of the input data receiving unit 1208, the execution instruction receiving unit 1212, and the result acquisition request receiving unit 1214 are combined into a request receiving unit 1603. In this case, when the back-end processing unit 402 executes the processing in step S1041, the request receiving unit 1603 serially executes the processing corresponding to the input data receiving unit 1208, the execution instruction receiving unit 1212, and the result acquisition request receiving unit 1214.

The back-end processing unit 402 receives a reply equivalent to that transmitted in step S1038 as a reply to the instruction transmitted in step S1041. In other words, in this case, the processing equivalent to steps S1035 through S1037 is not executed.

As described above, the three IN, PIPE or OUT request receiving units illustrated in FIGS. 12A through 12C are integrally provided as one unit in the examples illustrated in FIGS. 16A through 16C. However, alternatively, the functions of the three request receiving units can be dividedly and integrally provided to two request receiving units.

In other words, if the following requirements are met, the above-described alternative configuration can be employed. Firstly, it is required that data can be transmitted from the platform system 500 to the web service. Secondly, the platform system 500 can acquire data from the web service.

If the interface according to each exemplary embodiment of the present invention is implemented, the platform system 500 cannot directly access the web service while the two requirements are met. As a result, the developer of the service application is allowed to use the platform system 500 without publicizing the know-how and the technology of its own.

In addition, the vendor of the platform system 500 can maintain the quality of the platform system 500 at a constant high level because the platform system 500 cannot be utilized unless the service application that implements the interface is used.

In each exemplary embodiment of the present invention, one instance (one virtual machine) operates on a single server computer. However, the present invention is not limited to this. More specifically, if the server computer includes a multi-core CPU, a configuration including one instance for one core can be implemented. If the server computer complies with multi-threading, one CPU can implement at least one virtual machine (of course, two, three or more virtual machines).

As described above, according to each exemplary embodiment, the method for implementing one instance is not limited to a specific method. In other words, the method for implementing one instance according to each exemplary embodiment can be appropriately changed.

According to each exemplary embodiment of the present invention, the document conversion service 411 converts the content into PDF data. However, the document conversion service 411 can convert the content into any other appropriate formats. More specifically, the document conversion service 411 can have a function for converting the content into at least one of the following plurality of formats, i.e., page description language (PDL), such as PostScript (PS), Printer Control Language (PCL), and eXtended Markup Language (XML) Paper Specification (XPS).

As described above, the document conversion service 411 can convert the content into any appropriate data format other than those described above.

In addition, three tasks including the task 1, the task 2, and the task 3 are used as the task according to each exemplary embodiment of the present invention. However, the number of tasks is not limited to this. More specifically, by increasing the number of PIPE type tasks, the number of tasks can be increased.

In addition, as described above, the task service according to each exemplary embodiment of the present invention is divided into three service types because such a configuration is particularly useful to implement the present invention. More specifically, this is because the developer of the service application can increase the diversity of the processing program. In other words, the developer can reuse the processing program in developing another service application. However, if the effect of the present invention is not to be intended, the present invention is not limited to this.

In other words, it is not necessary to employ the configuration in which one IN or OUT task is included in one job. To paraphrase this, a plurality of IN or OUT tasks can be included in one job. Furthermore, only the IN type task can be included in one job. Alternatively, both the IN type task and the OUT type task can be included in one job.

In addition, instead of providing three service types, only one service type can be provided. In this case, the IN, PIPE, and OUT type services are integrated into one type. Alternatively, instead of using the three service types, namely, the IN (input), PIPE (processing), and OUT (output) types, four or more service types can be provided by further dividing the service types.

In each exemplary embodiment, the service is provided by the web service, and the address provided thereby is managed by URI. However, the service can be provided by any other method.

More specifically, the service can be provided by the interface of Representational State Transfer (REST) instead of the web service. Alternatively, the service can be provided by modules, such as Dynamic Link Library (DLL). In other words, if the document extraction service 410 is provided as DLL, the back-end processing unit 402 can execute the DLL. If the back-end processing unit 402 executes the DLL, the back-end processing unit 402 can function as the document extraction service 410.

If the back-end processing unit 402 has executed an IN type DLL, the document repository 406 acquires a document file. Accordingly, in this case, the developer of the task service is not required to structure a service providing apparatus for providing a task service.

However, in this case, the developer of the service is required to disclose the know-how and the technology of its own to the vendor of the platform system 500 where necessary. The address, such as uniform resource identifier (URI), is an address within the platform system 500.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading and out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2010-036555 filed Feb. 22, 2010 and No. 2010-118747 filed May 24, 2010, which are hereby incorporated by reference herein in their entirety.

What is claimed is:

1. A cloud computing system comprising:
   a request receiving unit implemented by executing a request receiving program and configured to store in a storage unit a message corresponding to a job requested by an image forming apparatus to be processed in response to a job processing request received by the image forming apparatus, the job being transmitted from the image forming apparatus to be processed; and a back-end processing unit implemented by executing a back-end processing program and configured to periodically input a request to acquire the message to the storage unit and to execute processing based on the message when the message is acquired from the storage unit, wherein the back-end processing unit comprises:

an identification unit configured to identify a task execution status of a job corresponding to the message acquired from the storage unit and to identify a task service to be executed next;

an instruction unit configured to issue an instruction for executing the identified task service to be executed next to a service providing apparatus for providing a task service corresponding to the identified task service among a plurality of service providing apparatuses, and to obtain a result of the execution of the identified task service in response to reception of a task end notification transmitted from the service providing apparatus;

a determination unit configured to determine whether a quality of the task service instructed by the instruction unit to execute processing of the job satisfies a reference condition; and a deletion instruction unit configured to, if it is determined by the determination unit that the quality of the task service does not satisfy the reference condition, instruct the storage unit to delete a message corresponding to the job instructed by the instruction unit from the storage unit, thereby increasing the quality of the cloud computing system and/or avoiding failure or adverse execution of the task service, wherein the back-end processing unit sequentially issues an instruction for executing a task service corresponding to the identified task service among a plurality of task services associated with sequence identification information which is identified based on a job requested by the image forming apparatus, and wherein the back-end processing unit issues to the storage unit the instruction for deleting the message in order to prevent another back-end processing unit from processing the job again in response to completion of processing of the job by causing the identified task service to be sequentially executed.

2. The cloud computing system according to claim 1, wherein the job transmitted from the image forming apparatus to be processed includes a task service, of the plurality of task services provided by the service providing apparatus, and a definition of order of executing the task services, and wherein the identification unit is configured to identify the task execution status by verifying an extent of utilization of task services by the job among predetermined task services.

3. The cloud computing system according to claim 1, wherein the quality is a rate of failure of the job processed by the task service.

4. The cloud computing system according to claim 3, wherein the request receiving unit includes a transmission unit configured to, if the message is deleted by the deletion instruction unit, transmit a notification indicating that the job has not been successfully processed to the image forming apparatus.

5. A method for controlling a cloud computing system, the cloud computing system including: a request receiving unit implemented by executing a request receiving program and configured to store in a storage unit a message corresponding to a job requested by an image forming apparatus to be processed in response to a job processing request received by the image forming apparatus, the job being transmitted from the image forming apparatus to be processed; and a back-end processing unit implemented by executing a back-end processing program and configured to periodically input a request to acquire the message to the storage unit and to execute processing based on the message when the message is acquired from the storage unit, the method comprising:

via the back-end processing unit, identifying a task execution status of a job corresponding to the message acquired from the storage unit and identifying a task service to be executed next;

issuing an instruction for executing the identified task service to be executed next to a service providing apparatus for providing a task service corresponding to the identified task service among a plurality of service providing apparatuses, and obtaining a result of the execution of the identified task service in response to reception of a task end notification transmitted from the service providing apparatus;

via the back-end processing unit, sequentially issuing an instruction for executing a task service corresponding to the identified task service among a plurality of task services associated with sequence identification information which is identified based on a job requested by the image forming apparatus;

via the back-end processing unit, determining whether a quality of the task service instructed to execute processing of the job satisfies a reference condition; and via the back-end processing unit, if it is determined that the quality of the task service does not satisfy the reference condition, issuing to the storage unit an instruction for deleting the message from the storage unit in order to prevent another back-end processing unit from processing the job again in response to completion of processing of the job by causing the identified task service to be sequentially executed, thereby increasing the quality of the cloud computing system and/or avoiding failure or adverse execution of the task service.

6. A non-transitory computer-readable storage medium storing instructions which, when executed by a computer, cause the computer to perform the method according to claim 5.

7. A cloud computing system comprising:

a request receiving unit implemented by executing a request receiving program and configured to store in a storage unit a message corresponding to a job requested by an image forming apparatus to be processed in response to a job processing request received by the image forming apparatus, the job being transmitted from the image forming apparatus to be processed;

a back-end processing unit implemented by executing a back-end processing program and configured to periodically input a request to acquire the message to the storage unit and to execute processing based on the message when the message is acquired from the storage unit; and a storage service unit that operates to: (i) cause the message, corresponding to the job, to become invisible to the back-end processing unit such that the storage unit does not transfer the message to the back-end unit in response to the request for the message from the back-end unit; and (ii) cause the message, corresponding to the job, to become visible to the back-end processing unit such that the storage unit transfers the message to the back-end processing unit in response to the request for the message from the back-end unit, wherein the back-end processing unit comprises:
an identification unit configured to identify a task execution status of a job corresponding to the message acquired from the storage unit and to identify a task service to be executed next; and
an instruction unit configured to issue an instruction for executing the identified task service to be executed next to a service providing apparatus for providing a task service corresponding to the identified task service among a plurality of service providing apparatuses, and to obtain a result of the execution of the identified task service in response to reception of a task end notification transmitted from the service providing apparatus,
wherein the back-end processing unit sequentially issues an instruction for executing a task service corresponding to the identified task service among a plurality of task services associated with sequence identification information which is identified based on a job requested by the image forming apparatus,
wherein the back-end processing unit issues to the storage unit an instruction for deleting the message in order to prevent another back-end processing unit from processing the job again in response to completion of processing of the job by causing the identified task service to be sequentially executed, and
wherein the storage service unit further operates to cause the message to become visible unless a processing result is returned from the back-end processing unit indicating that the processing of the message and/or the job will occur within a predetermined amount of time.

8. The cloud computing system according to claim 7, wherein, when the message becomes visible to the back-end processing unit, the storage service unit further operates to cause the storage unit to transfer the message to the back-end processing unit if the back-end processing unit has input a request for acquiring the message.

9. The cloud computing system according to claim 7, wherein, if the back-end processing unit has been abnormally terminated and cannot continue the processing, the processing is to be automatically retried.

* * * * *